(12) United States Patent
Ikehara et al.

(10) Patent No.: US 9,838,120 B2
(45) Date of Patent: Dec. 5, 2017

(54) OPTICAL SIGNAL RECEIVER, OPTICAL SIGNAL COMMUNICATION SYSTEM AND OPTICAL SIGNAL RECEIVING METHOD

(71) Applicant: Panasonic Intellectual Property Management Co., Ltd., Osaka (JP)

(72) Inventors: Masaaki Ikehara, Osaka (JP); Yoshihiko Matsukawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 331 days.

(21) Appl. No.: 14/620,313

(22) Filed: Feb. 12, 2015

(65) Prior Publication Data

US 2015/0229392 A1 Aug. 13, 2015

(30) Foreign Application Priority Data

Feb. 12, 2014 (JP) ................... 2014-024951

(51) Int. Cl.
*H04B 10/00* (2013.01)
*H04B 10/116* (2013.01)

(52) U.S. Cl.
CPC ................... *H04B 10/116* (2013.01)

(58) Field of Classification Search
CPC ... H04B 10/116; H04B 10/114; H04B 10/112; H04B 10/1143; H04B 10/1149; H04B 10/60; H04B 10/1121; H04B 10/1123; H04B 10/40; H04B 10/43
USPC ....... 398/172, 118, 119, 127, 128, 130, 135, 398/136, 202, 208, 209, 182, 183, 186, 398/115, 188, 33, 38; 315/291, 307, 294, 315/312, 308, 293
See application file for complete search history.

(56) References Cited

U.S. PATENT DOCUMENTS

| | | | | |
|---|---|---|---|---|
| 8,452,188 B2* | 5/2013 | Shin | ................... | H04B 10/1149 398/172 |
| 2007/0121494 A1* | 5/2007 | Kobayashi | ........ | H04W 52/0225 370/229 |
| 2011/0069971 A1* | 3/2011 | Kim | ..................... | H04B 10/116 398/172 |
| 2013/0225237 A1* | 8/2013 | Minami | ............ | H04W 52/0245 455/556.1 |

FOREIGN PATENT DOCUMENTS

| | | |
|---|---|---|
| JP | 2000-146690 A | 5/2000 |
| JP | 2005-268845 A | 9/2005 |
| JP | 2009-105849 A | 5/2009 |
| JP | 2011-193213 A | 9/2011 |
| JP | 2013-197805 A | 9/2013 |

* cited by examiner

Primary Examiner — Hanh Phan
(74) Attorney, Agent, or Firm — Renner, Otto, Boisselle & Sklar, LLP

(57) ABSTRACT

An optical signal receiver receives an optical signal superimposed on illumination light from an illumination apparatus which repetitively transmits as the optical signal a frame including predetermined information and a preamble indicating the start of the frame. Further, the optical signal receiver includes a light receiving unit configured to receive the optical signal, and a controller configured to control the light receiving unit based on the optical signal received by the light receiving unit such that the optical signal receiver operates in either one of an intermittent reception mode of intermittently receiving the optical signal and a continuous reception mode of continuously receiving the optical signal.

21 Claims, 18 Drawing Sheets

FIG. 3

| DATA | 4PPM | OPTICAL SIGNAL |
|---|---|---|
| 00 | 1000 | |
| 01 | 0100 | |
| 10 | 0010 | |
| 11 | 0001 | |

104μs  312μs

「1」   「000」

MINIMUM STATE
PREAMBLE
...111 0000 0000 0000 1000 ... 1000 1000...
PREDETERMINED TIME PERIOD T

MAXIMUM STATE
...0 0100 0100 0100 0100 ... 0100 1000...
PREDETERMINED TIME PERIOD T

OPTICAL SIGNAL RECEIVER, OPTICAL SIGNAL COMMUNICATION SYSTEM AND OPTICAL SIGNAL RECEIVING METHOD

CROSS-REFERENCE TO RELATED APPLICATION

This application claims priority to Japanese Patent Application No. 2014-024951 filed on Feb. 12, 2014, the entire contents of which are incorporated herein by reference.

TECHNICAL FIELD

The present disclosure relates to an optical signal receiver, an optical signal communication system and an optical signal receiving method, and more particularly to an optical signal receiver, an optical signal communication system and an optical signal receiving method for receiving an optical signal superimposed on illumination light from an illumination apparatus.

BACKGROUND ART

Recently, technology that superimposes an optical signal on illumination light (visible light) from an illumination apparatus by using light intensity modulation or the like has been known. Thus, it is possible to transmit information as well as to irradiate the illumination light from the illumination apparatus.

In optical communication (visible light communication) using the illumination light, a transmission range is limited to a range in which the illumination light reaches unlike normal wireless communication. Accordingly, there is an advantage that a communication range can be confirmed visually, or the transmission range can be limited to a limited space (area). As an application system using such an advantage, there is known a position information system in which identification information is transmitted as an optical signal from each of a plurality of illumination apparatuses provided in a facility, and the identification information is received by an optical signal receiver provided in a moving body, thereby specifying a position (current position) of the moving body. By this position information system, it is possible to specify the position of the moving body in an indoor space in which radio waves of Global Positioning System (GPS) are difficult to reach.

Since the optical signal receiver installed to the moving body is operated by a battery, there is a demand for a reduction in power consumption. Conventionally, various techniques for suppressing power consumption of the optical signal receiver have been proposed (see, e.g., Japanese Unexamined Patent Publication Application No. 2000-146690). In Japanese Unexamined Patent Publication Application No. 2000-146690, power consumption is reduced by intermittently performing power supply to a light receiving unit provided in the optical signal receiver.

However, in the technique disclosed in Japanese Unexamined Patent Publication Application No. 2000-146690 of merely intermittently performing the power supply, a reduction in power consumption is not sufficient. That is, even in a state (standby state) where the optical signal from an illumination apparatus is not received, the reception of the optical signal is monitored and accordingly power is consumed to some extent. Further, in a state where the optical signal is transmitted from the illumination apparatus and received by the optical signal receiver, power is supplied continuously even when the same information is transmitted repeatedly. Thus, power is consumed wastefully.

SUMMARY OF THE INVENTION

In view of the above, the present disclosure provides an optical signal receiver, an optical signal communication system and an optical signal receiving method capable of further suppressing power consumption.

In accordance with an aspect of the present invention, there is provided an optical signal receiver for receiving an optical signal superimposed on illumination light from an illumination apparatus which repetitively transmits as the optical signal a frame including predetermined information and a preamble indicating the start of the frame, the optical signal receiver including a light receiving unit configured to receive the optical signal, and a controller configured to control the light receiving unit based on the optical signal received by the light receiving unit such that the optical signal receiver operates in either one of an intermittent reception mode of intermittently receiving the optical signal and a continuous reception mode of continuously receiving the optical signal. The intermittent reception mode includes an optical signal non-irradiation phase for detecting that the optical signal from the illumination apparatus is being transmitted, and an optical signal irradiation phase for determining whether the frame is a frame including the same predetermined information as that of a previous frame in a state where the optical signal is received by the light receiving unit, and the continuous reception mode includes a search phase for searching for the preamble of the frame included in the received optical signal, a period specifying phase for specifying a repetition period of the frame based on results of the search phase, and an information acquisition phase for acquiring the predetermined information by decoding at least one frame included in the received optical signal.

In the optical signal irradiation phase, the light receiving unit may receive specific information included in one frame of M frames every M frames included in the optical signal, M being an integer of two or more, and the controller may determine whether the one frame is a frame including the same specific information as the previous frame by comparing the specific information of the one frame with that of the previous frame.

In the optical signal irradiation phase, the light receiving unit may receive the specific information every M frames based on the repetition period specified in the period specifying phase.

Preferably, the specific information is an error detection code for detecting a data error of the frame to which the specific information belongs.

It is preferred that the optical signal is a signal superimposed on the illumination light by using light intensity modulation and N-values pulse position modulation, N being an integer of 2 or more, and, in the optical signal non-irradiation phase, the controller detects that the optical signal from the illumination apparatus is being transmitted, by determining the number of pulses included in the optical signal received during a predetermined period of time.

In the optical signal non-irradiation phase, the controller may determine the number of pulses every period corresponding to a time for which a plurality of frames are transmitted.

In the optical signal non-irradiation phase, the controller may determine the number of pulses every period corresponding to a time for which M frames are transmitted.

In the optical signal non-irradiation phase, if it is detected that the optical signal from the illumination apparatus is being transmitted, the controller may allow the optical signal receiver to transition to the continuous reception mode from the intermittent reception mode.

In the optical signal irradiation phase, if it is determined that the frame is not a frame including the same information as the previous frame, the controller may allow the optical signal receiver to transition to the continuous reception mode from the intermittent reception mode.

Further, when the optical signal receiver transitions to the continuous reception mode from the intermittent reception mode, the controller may allow the optical signal receiver to transition to the continuous reception mode from the intermittent reception mode only when it is determined that an elapsed time from the latest time when the predetermined information is obtained in the information acquisition phase is greater than a predetermined value.

In the intermittent reception mode, when the intensity of the optical signal received by the light receiving unit is less than a predetermined value, the controller may maintain the optical signal receiver in the intermittent reception mode without allowing to transition to the continuous reception mode.

Further, after completion of the search phase, the period specifying phase and the information acquisition phase in the continuous reception mode, the controller may allow the optical signal receiver to transition to the intermittent reception mode.

Preferably, after the optical signal receiver is allowed to transition from the continuous reception mode to the intermittent reception mode, the controller allows the optical signal receiver to operate in the optical signal irradiation phase if the optical signal from the illumination apparatus is being transmitted.

Further, the optical signal receiver may include an output unit which, after the predetermined information is acquired in the information acquisition phase, transmits the acquired predetermined information to an external device, wherein after transmission of the predetermined information by the output unit, the controller may allow the optical signal receiver to transition from the continuous reception mode to the intermittent reception mode.

Alternatively, after completion of the information acquisition phase, if the optical signal irradiation phase is continued for a predetermined time, the output unit may transmit predetermined data or the predetermined information acquired in the information acquisition phase to the external device.

Furthermore, the optical signal receiver may include an acceleration/velocity sensor configured to detect at least one of acceleration and velocity of the optical signal receiver, wherein the controller may change a period of intermittently receiving the optical signal in the intermittent reception mode based on at least one of the acceleration and the velocity detected by the acceleration/velocity sensor.

Further, the optical signal receiver may include an illuminance sensor configured to detect an illuminance, wherein if the illuminance detected by the illuminance sensor is smaller than a predetermined value, the controller may allow the optical signal receiver to transition from the intermittent reception mode to a ready-to-receive mode in which the optical signal receiver operates at lower power consumption than power consumption in the intermittent reception mode.

In accordance with another aspect of the present invention, there is provided an optical signal receiving method and a computer-readable program which allows the optical signal receiving method to be executable in a computer included in an optical signal receiver for receiving an optical signal superimposed on illumination light from an illumination apparatus which repeatedly transmits a frame including predetermined information and a preamble indicating the start of the frame by the optical signal, the optical signal receiving method includes operating in an intermittent reception mode of intermittently receiving the optical signal, and operating in a continuous reception mode of continuously receiving the optical signal. In the optical signal receiving method, the intermittent reception mode includes an optical signal non-irradiation phase for detecting that the optical signal from the illumination apparatus is being transmitted, and an optical signal irradiation phase for determining whether the frame is a frame including the same predetermined information as that of a previous frame in a state where the optical signal is received by the light receiving unit, and wherein the continuous reception mode includes a search phase for searching for the preamble of the frame included in the received optical signal, a period specifying phase for specifying a repetition period of the frame based on results of the search phase, and an information acquisition phase for acquiring the predetermined information by decoding at least one frame included in the received optical signal.

In accordance with still another aspect of the present invention, there is provided an optical signal communication system including an illumination apparatus which repetitively transmits as an optical signal a frame including predetermined information and a preamble indicating the start of the frame; and an optical signal receiver configured to receive the optical signal superimposed on illumination light from the illumination apparatus. Further, the optical signal receiver includes: a light receiving unit configured to receive the optical signal; and a controller configured to control the light receiving unit based on the optical signal received by the light receiving unit such that the optical signal receiver operates in either one of an intermittent reception mode of intermittently receiving the optical signal and a continuous reception mode of continuously receiving the optical signal. The intermittent reception mode includes an optical signal non-irradiation phase for detecting that the optical signal from the illumination apparatus is being transmitted, and an optical signal irradiation phase for determining whether the frame is a frame including the same predetermined information as that of a previous frame in a state where the optical signal is received by the light receiving unit. Further, the continuous reception mode includes a search phase for searching for the preamble of the frame included in the received optical signal, a period specifying phase for specifying a repetition period of the frame based on results of the search phase, and an information acquisition phase for acquiring the predetermined information by decoding at least one frame included in the received optical signal.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 3 is a diagram for explaining 4 PPM that is an example of N-values pulse position modulation.

DETAILED DESCRIPTION

Hereinafter, an embodiment of the present invention will be described in detail with reference to the drawings. The embodiment to be described below is a preferred specific example of the present invention. Numeral values, shapes, materials, components, arrangements and connection forms of the components, steps, order of the steps, and the like shown in the embodiment are only examples, and will not limit the present invention. Moreover, among the components of the embodiment, the components not described in representative independent claims of the present invention may be implemented by more preferred arbitrary components.

Figure 1:
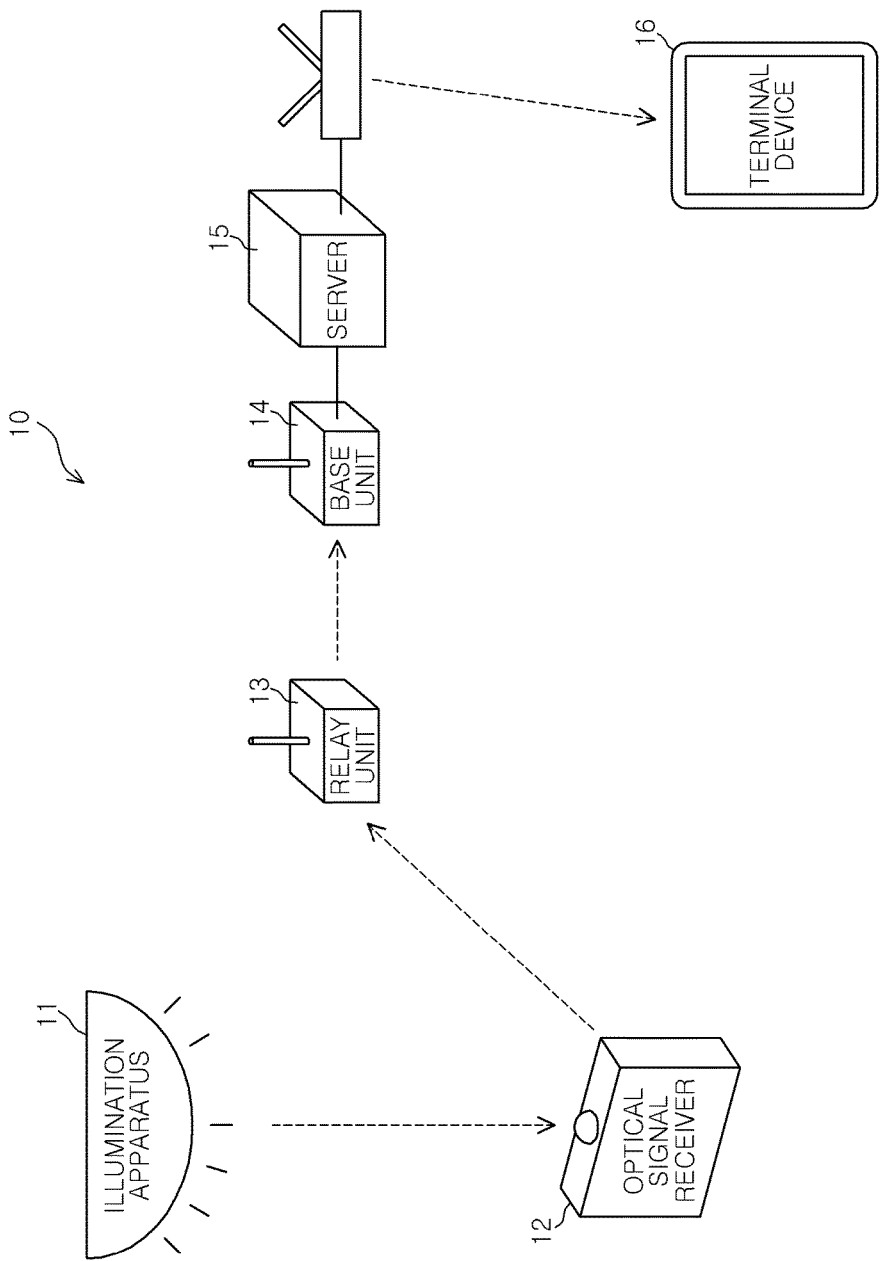
FIG. 1 shows a configuration of an optical signal communication system according to an embodiment of the present invention.

FIG. 1 is a diagram showing a configuration of an optical signal communication system 10 according to an embodiment of the present invention. The optical signal communication system 10 is an example of the position information system described above, and includes an illumination apparatus 11, an optical signal receiver 12, a relay unit 13, a base unit 14, a server 15 and a terminal device 16.

Each of the illumination apparatus 11, the optical signal receiver 12, the relay unit 13 and the base unit 14 may be provided in a plural number. For the sake of simplification, only one is shown for each of them in FIG. 1. In this embodiment, as the position information system, position management is performed by specifying a position of the optical signal receiver 12 attached to, e.g., a moving medical device or a nurse in the hospital and displaying the position on the terminal device 16. The medical device is, e.g., an infusion pump, a syringe pump, an ultrasonic diagnostic device, a blood pressure meter or the like.

The illumination apparatus 11 is an illumination fixture which emits illumination light on which an optical signal is superimposed. In this case, the illumination apparatus 11 transmits its own identification information (ID) by light intensity modulation using a light emitting diode (LED) or the like. The ID of the illumination apparatus 11 is information used to specify the position of the optical signal receiver 12 in this application example (position information system), and also called "position ID."

The optical signal receiver 12 is a device for receiving an optical signal superimposed on the illumination light from the illumination apparatus 11. In this embodiment, the optical signal receiver 12 is a portable battery-operated device and is attached to the nurse or the medical device. The optical signal receiver 12 combines the ID (position ID) received through the optical signal transmitted from the illumination apparatus 11 with the ID (hereinafter, also referred to as "individual ID") and transmits the combined IDs to the server 15 through the relay unit 13 and the base unit 14 in wireless communication. The "individual ID" is identification information unique to the optical signal receiver 12, or identification information of the nurse or the medical device to which the optical signal receiver 12 is attached. The individual ID is stored in the optical signal receiver 12 in advance or by a user's settings.

The relay unit 13 is a communication device for relay to transmit the position ID and the individual ID sent from the optical signal receiver 12 to the base unit 14. The relay unit 13 is, e.g., a relay device for wireless LAN which is installed on each floor of the hospital.

The base unit 14 is a communication device for data collection to receive the position ID and the individual ID sent from the relay unit 13 and transmit the IDs to the server 15. For example, the base unit 14 is a base unit (access point) for wireless LAN, which is connected to the server 15 through a wired LAN.

The server 15 is a management apparatus in the position information system. The server 15 is a Web server which specifies the position (current position) of the optical signal receiver 12 based on the position ID and the individual ID sent from the optical signal receiver 12, and transmits the specified result to the terminal device 16. For example, with reference to a table stored in advance, the server 15 specifies the position (e.g., room number where the illumination apparatus 11 is installed) in the hospital from the received position ID, and specifies the name of the nurse or the medical device from the received individual ID. Then, in response to a request from the terminal device 16, the server 15 transmits the specified position and the specified name of the nurse or the medical device to the terminal device 16 through a communication network such as a LAN.

The terminal device 16 is a terminal device in the position information system. For example, the terminal device 16 is a portable information terminal such as a smart phone or a personal computer (PC). In this embodiment, the terminal device 16 accesses the server 15 through a Web browser, receives the specified position of the optical signal receiver 12 and the specified name of the nurse or the medical device, to which the optical signal receiver 12 is attached, from the server 15, and displays them on the screen.

With the application (position information system) of the optical signal communication system 10, it is possible to know the current positions of the nurse and the medical device in the hospital by using the terminal device 16.

Figure 2:
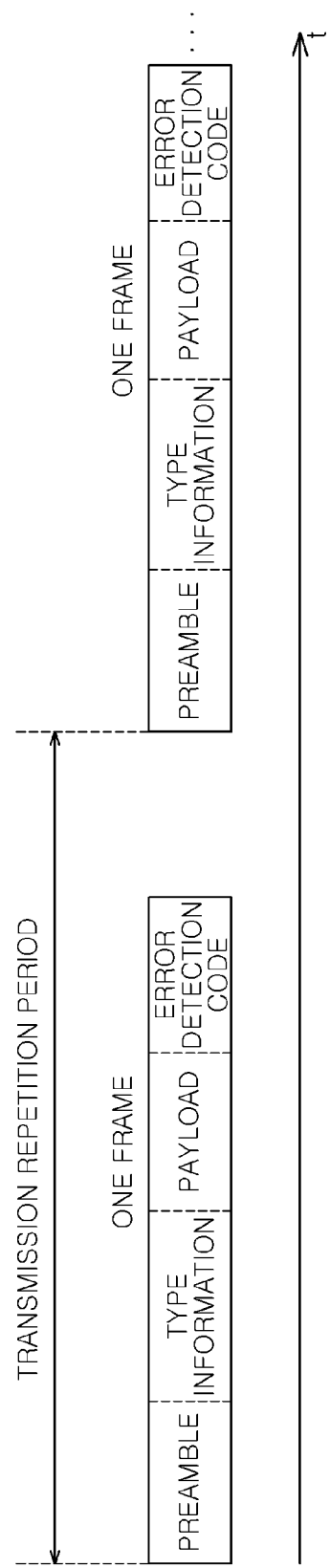
FIG. 2 shows format of an optical signal transmitted by an illumination apparatus of FIG. 1.

FIG. 2 is a diagram showing format of the optical signal transmitted from the illumination apparatus 11 of FIG. 1. As shown in FIG. 2, the illumination apparatus 11 repeatedly transmits a frame including predetermined information (in this case, the ID of the illumination apparatus 11) by the optical signal superimposed on the illumination light. Each frame has a predetermined number of bits and includes a preamble indicating the beginning of the frame, type information indicating the type of the frame, a payload indicating any information (in this case, the ID of the illumination apparatus 11), and an error detection code of the frame. The error detection code is a code for detecting a data error of the frame and is, e.g., a Cyclic Redundancy Check (CRC) code. As the format of the optical signal, for example, a signal defined in CP-1223 "Visible Light Beacon System" of Japanese Electronics and Information Technology Industries Association standards (JEITA) may be used.

Figure 3:
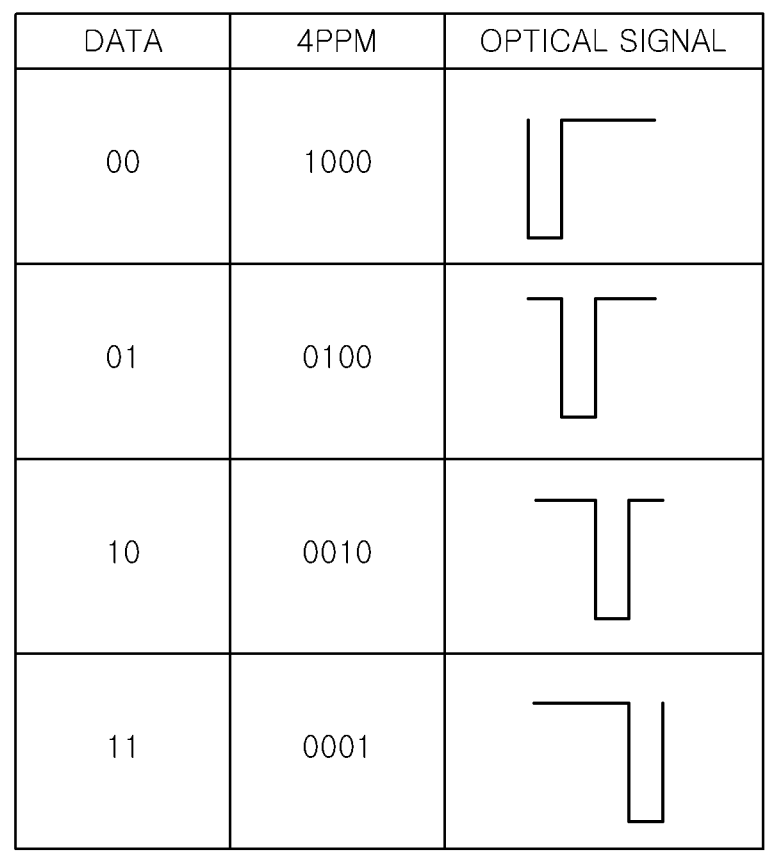

As the light intensity modulation of the optical signal superimposed on the illumination light, in this embodiment, N-values pulse position modulation (PPM) (N is an integer of 2 or more) is used. FIG. 3 is a diagram illustrating 4 PPM which is an example of N-values pulse position modulation. In the 4 PPM, 2 bits are represented by one symbol of a predetermined time length.

Figure 4:
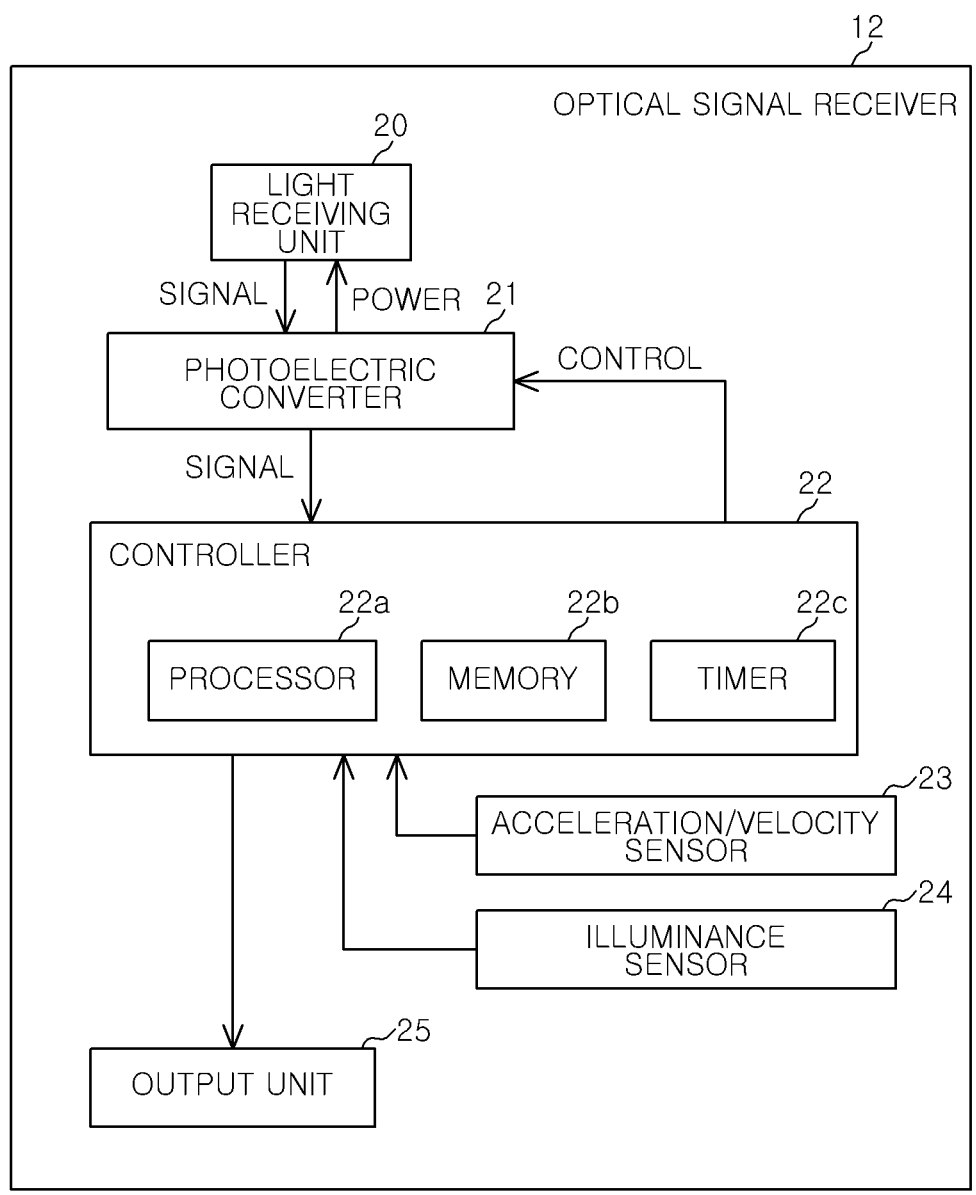
FIG. 4 is a block diagram showing a configuration of an optical signal receiver of FIG. 1.

FIG. 4 is a block diagram showing a configuration of the optical signal receiver 12 of FIG. 1. The optical signal receiver 12 receives the optical signal superimposed on the illumination light from the illumination apparatus 11. The optical signal receiver 12 includes a light receiving unit 20, a photoelectric converter 21, a controller 22, an acceleration/velocity sensor 23, an illuminance sensor 24 and an output unit 25. In FIG. 4, a power supply circuit for supplying power to the respective components (photoelectric converter 21, the controller 22, the acceleration/velocity sensor 23, the illuminance sensor 24 and the output unit 25) is not illustrated. The power supply circuit may be, e.g., a constant voltage circuit including a battery to convert an output voltage of the battery to a constant voltage and supply the constant voltage to each component.

The light receiving unit 20 includes a light receiving sensor for receiving the optical signal transmitted from the illumination apparatus 11, and includes a light receiving element for visible light in this embodiment.

The photoelectric converter 21 drives the light receiving unit 20 based on a control signal from the controller 22, and generates an electrical signal (analog or digital signal) corresponding to intensity of the optical signal received by the light receiving unit 20. In the case of generating a digital signal, a comparator (not shown) which compares the electrical signal with a threshold value may be further included. The "driving of the light receiving unit 20" means supplying power to the light receiving unit 20.

The controller 22 includes a micro-computer to control the driving of the light receiving unit 20 by the photoelectric converter 21, or to control the output unit 25, based on the optical signal received by the light receiving unit 20, a signal from the acceleration/velocity sensor 23 and a signal from the illuminance sensor 24. The controller 22 includes a memory 22b including a ROM storing a control program and a RAM serving as a temporary working area, a timer 22c for measuring time, and a processor 22a which performs a control processing in accordance with the control program stored in the memory 22b. The controller 22 further includes a built-in A/D converter for converting an electrical signal (in case of analog signal) outputted from the photoelectric converter 21 into a digital value. Further, the controller 22 may be in a low power consumption state (sleep state) during a standby state in which processing is not executed. When the controller 22 is in the sleep state, the power supply to the components other than the controller 22 is stopped.

The controller 22 controls the driving of the light receiving unit 20 by the photoelectric converter 21 based on the optical signal received by the light receiving unit 20. Accordingly, the optical signal receiver 12 selectively operates in one of, at least, an intermittent reception mode and a continuous reception mode. The intermittent reception mode is an operation mode in which the optical signal receiver 12 (specifically, the light receiving unit 20) intermittently receives the optical signal from the illumination apparatus 11. The continuous reception mode is an operation mode in which the optical signal receiver 12 (specifically, the light receiving unit 20) continuously receives the optical signal from the illumination apparatus 11.

The acceleration/velocity sensor 23 includes a sensor for detecting at least one of acceleration and velocity of the optical signal receiver 12 and includes, e.g., a three-axis acceleration sensor and an angular velocity sensor (gyro sensor).

The illuminance sensor 24 includes a sensor for detecting illuminance (ambient brightness) and includes, e.g., a detection circuit including a phototransistor.

The output unit 25 serves as a communication interface which transmits the information (in this embodiment, the position ID and the individual ID) transmitted from the controller 22 to an external device (in this case, the server 15). In this embodiment, the information is transmitted to the server 15 wirelessly through the relay unit 13 by the output unit 25 and to the base unit 14.

Next, there will be described an operation of the optical signal receiver 12 in the optical signal communication system 10 configured as described above according to the present embodiment.

Figure 5:
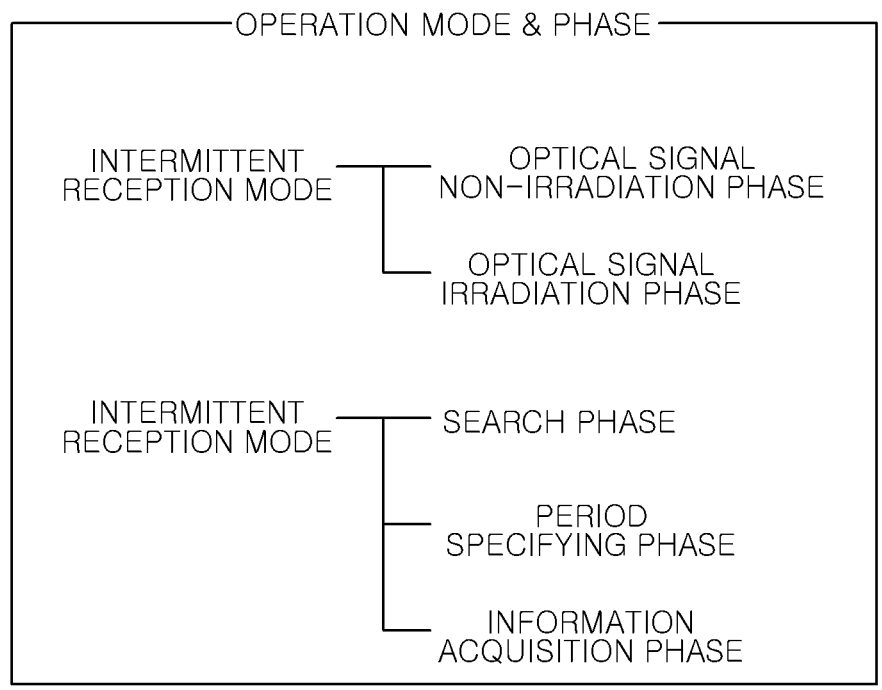
FIG. 5 is a diagram for explaining operation modes of the optical signal receiver.

In the present embodiment, the operation modes of the optical signal receiver 12 is realized by functions of the controller 22 included in the optical signal receiver 12. Specifically, as shown in FIG. 5, the optical signal receiver 12 has, as the operation mode, an intermittent reception mode for intermittently receiving the optical signal, and a continuous reception mode for continuously receiving the optical signal. The intermittent reception of the optical signal is realized by allowing the photoelectric converter 21 to intermittently drive the light receiving unit 20 under the control of the controller 22. Power consumption of the optical signal receiver in the intermittent reception mode is small compared to that in the continuous reception mode in which the light receiving unit 20 is driven continuously.

As shown in FIG. 5, the intermittent reception mode includes an optical signal non-irradiation phase and an optical signal irradiation phase. In the optical signal non-irradiation phase, the optical signal receiver 12 performs a process for detecting that a state where no optical signal is received during a predetermined time period by the optical signal receiver 12 has changed to a state where the optical signal is received by the optical signal receiver 12. In the optical signal irradiation phase, the optical signal receiver 12 performs a process for determining whether or not consecutive two or more frames transmitted from the illumination apparatus 11 include the same information in the state where the optical signal is received by the optical signal receiver 12.

On the other hand, the continuous reception mode includes a search phase, a period specifying phase, and an information acquisition phase. In the search phase, the optical signal receiver 12 performs a process for searching for a preamble of a frame included in the received optical signal. In the period specifying phase, the optical signal receiver 12 performs a process for specifying a repetition period of the frame included in the optical signal transmitted from the illumination apparatus 11 based on the result of the search phase. In the information acquisition phase, the optical signal receiver 12 performs a process for acquiring predetermined information (in this case, the ID of the illumination apparatus 11) by decoding at least one frame that has been received.

Basically, the optical signal receiver 12 is in either one of five phases (optical signal non-irradiation phase, the optical signal irradiation phase, the search phase, the period specifying phase, and the information acquisition phase). Accordingly, the optical signal receiver 12 operates in either one of two operation modes (intermittent reception mode and the continuous reception mode).

Figure 6A:
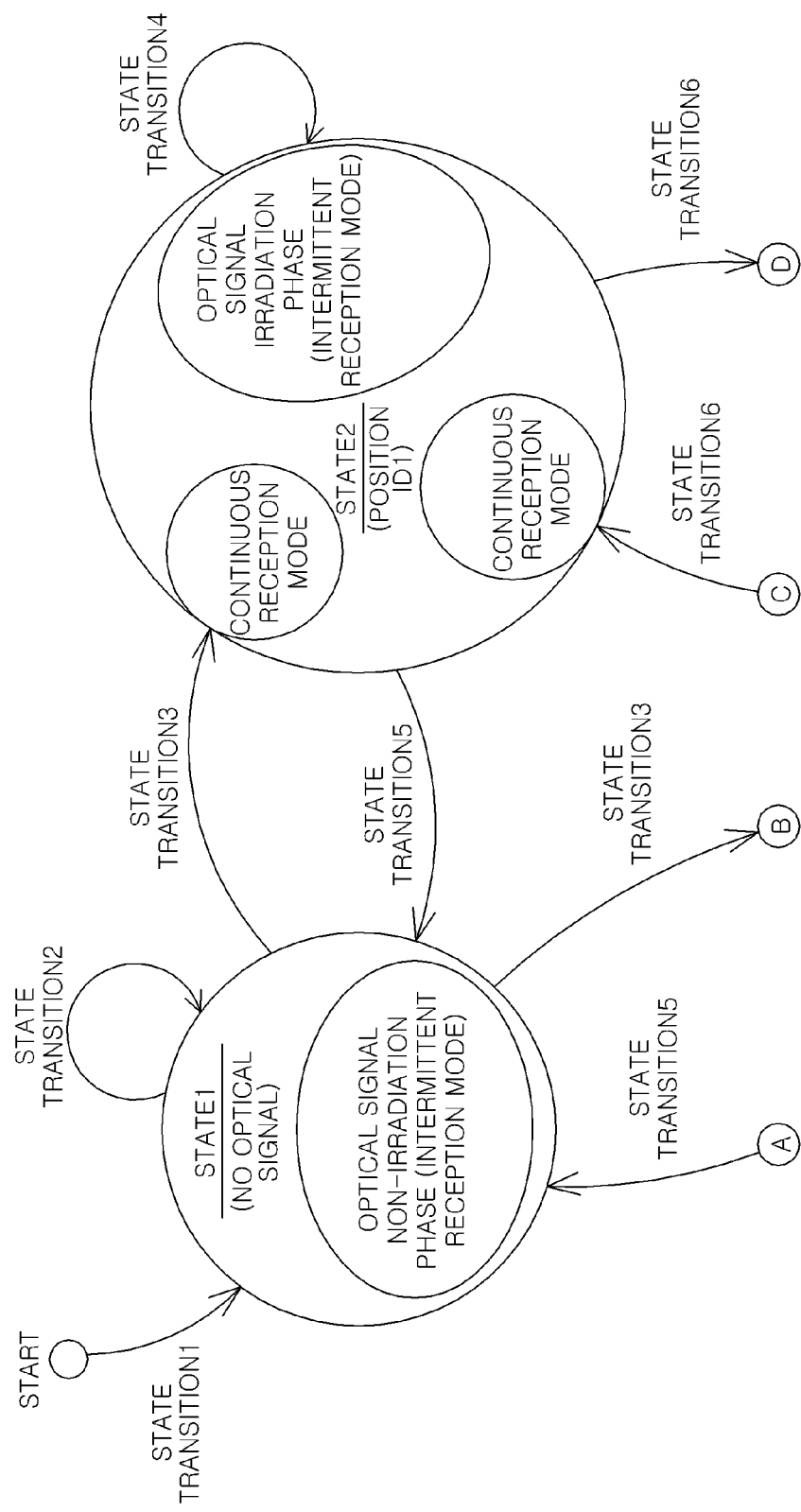
FIGS. 6A and 6B are a state transition diagram showing transitions of operation modes and phases shown in FIG. 5.
Figure 6B:
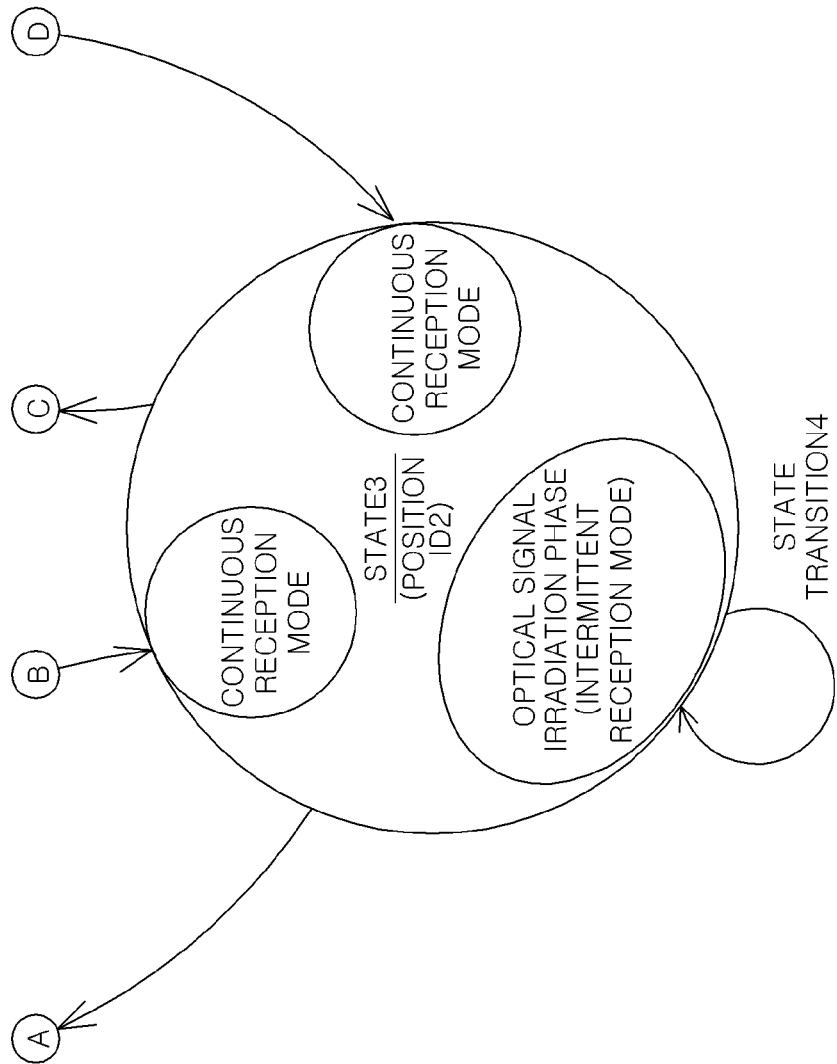

FIGS. 6A and 6B are a state transition diagram showing transitions of the operation mode and the phase shown in FIG. 5. In FIGS. 6A and 6B, a state transition of the optical signal receiver 12 is illustrated in a situation where two illumination apparatuses 11 with different position IDs are provided. In the state transition diagram of FIG. 6A, "state 1" is a state where the optical signal receiver 12 is placed at a position in which no optical signal is present ("no optical signal"). "State 2" is a state where the optical signal receiver 12 is present at a position in which an optical signal from the illumination apparatus 11 corresponding to position ID1 is received. "State 3" is a state where the optical signal receiver 12 is present at a position in which an optical signal from the illumination apparatus 11 corresponding to position ID2 is received.

[State Transition 1]

If the optical signal receiver 12 is powered on at the position where no optical signal is present, the optical signal receiver 12 enters state 1 ("state transition 1" of FIG. 6A).

[State 1]

In state 1, the optical signal receiver 12 is in the optical signal non-irradiation phase of the intermittent reception mode. That is, the controller 22 monitors the optical signal to detect that a change has occurred from the state where no optical signal is received by the optical signal receiver 12 to the state where the optical signal is received by the optical signal receiver 12.

Specifically, the controller 22 detects that the state where no optical signal is received by the optical signal receiver 12 has changed to the state where the optical signal is received by the optical signal receiver 12, by determining the number of pulses included in the optical signal received during a predetermined time period (determining whether the number of pulses is within a certain range). In this embodiment, since the optical signal is modulated by 4 PPM, it is determined that the number of pulses included in the received optical signal during a predetermined time period is in a certain range.

Figure 7A:
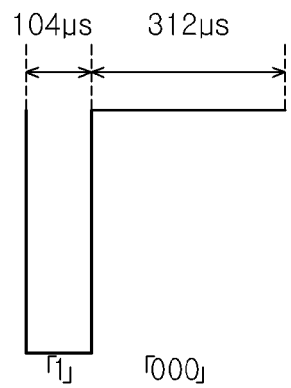
FIGS. 7A to 7C are diagrams for explaining the characteristics of the optical signal in the embodiment.
Figure 7B:
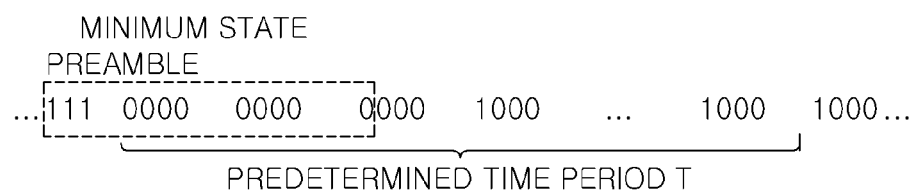
Figure 7C:
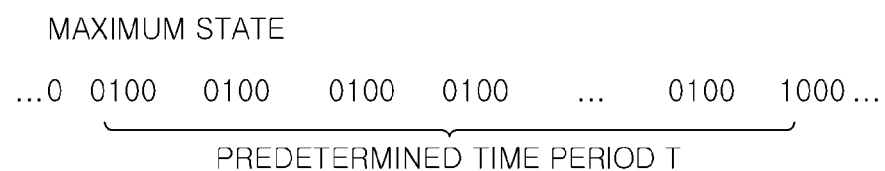

FIGS. 7A to 7C are diagrams for explaining the characteristic of the optical signal that the number of pulses received in a predetermined time period is in a certain range in this embodiment. As shown in FIG. 7A, in the case of 4 PPM, basically, the time period of 416 μs is assigned to one symbol and a pulse is generated every 416 μs. In this case, the preamble of the frame has a special pattern as shown by a dotted box in FIG. 7B. Thus, during the predetermined time period T=416×n (n is a natural number greater than 3) [μs], the number of pulses C becomes in the range of T/416−3≤C≤T/416+1 as can be seen from "minimum state" shown in FIG. 7B and "maximum state" shown in FIG. 7C. Although not shown, if the preamble of the frame is, e.g., '1110 0000', the number of pluses C becomes in the range of T/416−2≤C≤T/416+2 during the predetermined time period T=416×n (n is a natural number greater than 2) [μs]. Further, if the preamble of the frame is, e.g., '1110' or '111', the number of pluses C becomes in the range of T/416−1≤C≤T/416+1 during the predetermined time period T=416×n (n is a natural number greater than 1) [μs].

In the optical signal non-irradiation phase, in each period (in this case, a period in which four frames are transmitted) corresponding to the time for which M frames (M is an integer of 2 or more) are transmitted, the controller 22 operates for a predetermined period of time to determine the number of pulses received in the predetermined period of time. In the embodiment, the period corresponding to the time for which M frames (M is an integer of 2 or more) are transmitted is a period (time interval) for repeatedly monitoring the number of pulses received for the predetermined period of time.

The predetermined period of time is a time corresponding to, e.g., a cyclic redundancy check (CRC) field. The controller 22 operates for the predetermined period of time in the time corresponding to four frames and is in the sleep state (i.e., in the low power consumption mode) during the other time, by using the timer 22c. In this case, the photoelectric converter 21 drives the light receiving unit 20 for the predetermined period of time under the control of the controller 22. Thus, in the optical signal non-irradiation phase, the power consumption of the optical signal receiver 12 is small compared to that in the operation mode (continuous reception mode) in which normal power supply is performed.

[State Transition 2]

The optical signal receiver 12 maintains the optical signal non-irradiation phase (intermittent reception mode) as long as the state (state 1) where no optical signal is received by the optical signal receiver 12 is continued ("state transition 2" of FIG. 6A). In this embodiment, if the number of pulses received in the predetermined period of time of the time for which four frames are transmitted is not in the certain range, it is determined that the optical signal is not received and accordingly the optical signal non-irradiation phase is kept.

[State Transition 3]

Upon receiving the optical signal in state 1, the optical signal receiver 12 transitions to the continuous reception mode of state 2 corresponding to position ID1 or the continuous reception mode of state 3 corresponding to position ID2 ("state transition 3" of FIGS. 6A and 6B). That is, in the optical signal non-irradiation phase (state 1), when it is detected that the state where no optical signal is received has changed to the state where the optical signal is received, the controller 22 causes the optical signal receiver 12 to transition from the intermittent reception mode to the continuous reception mode (state 2 or state 3).

In FIGS. 6A and 6B, "state transition 3" includes two transitions, i.e., a transition from state 1 to state 2 and a transition from state 1 to state 3, but both transitions are transitions of the same type (modes and phases of a transition source and a transition destination are the same). These transitions do not occur simultaneously, and either one transition occurs at a time. Which transition will occur is determined according to a situation before and after the transition. In this case, state transition 2 or 3 is determined according to the position ID included in the received optical signal. The same may apply to another "state transition n".

Figure 8:
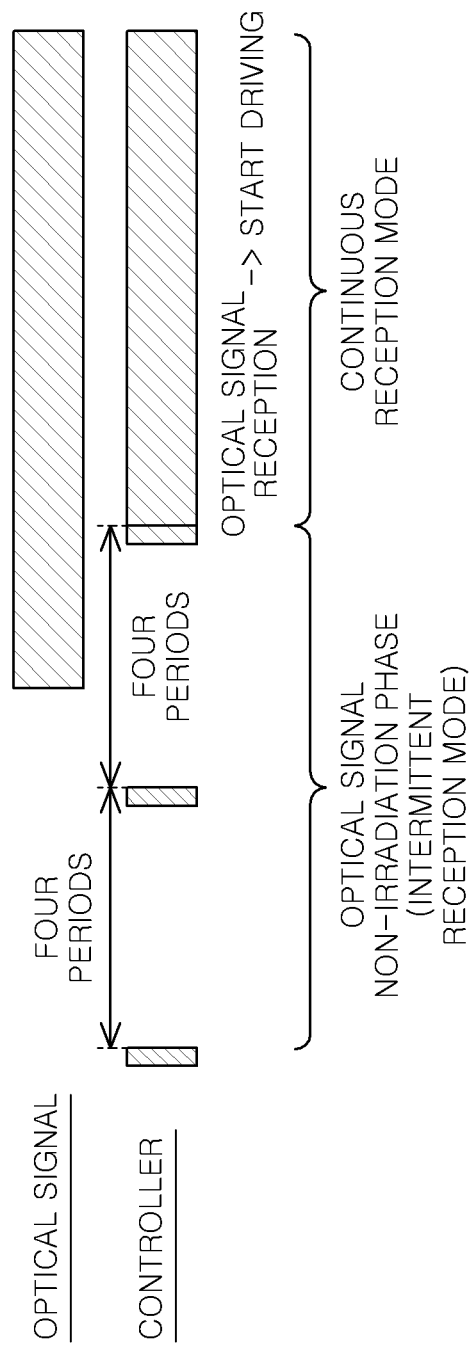
FIG. 8 is a diagram showing an operation timing of the optical signal receiver in "state transition 3" of FIG. 6A.

FIG. 8 is a diagram showing an operation timing of the optical signal receiver 12 in "transition state 3" of FIGS. 6A and 6B. In FIG. 8, the time is elapsing from left to right (the same applies to other diagrams showing an operation timing). In FIG. 8, a timing at which the optical signal is received is illustrated in the row of "optical signal" and an operation timing of the controller 22 is illustrated in the row of "controller". In the optical signal non-irradiation phase, the controller 22 wakes up from the sleep state to check the number of pulses during the predetermined period of time (in this embodiment, the period of time corresponding to the CRC field) of the time ("4 periods" in FIG. 8) for which four frames are transmitted. Upon detecting the reception of the optical signal, the controller 22 transitions to the continuous reception mode (hatched portion in the row of "controller" of FIG. 8).

[State 2, State 3]

In the continuous reception mode, the controller 22 executes the search phase, the period specifying phase, and the information acquisition phase.

Specifically, the controller 22 searches for the preamble of the frame included in the received optical signal (search phase) and, based on the result, specifies a repetition period of the frame included in the optical signal transmitted from the illumination apparatus 11 (period specifying phase). Further, the controller 22 decodes at least one frame (the first frame in this embodiment) that has been received and acquires predetermined information (in this embodiment, position ID1 or ID2) included in the frame (information acquisition phase).

In the search phase, the controller 22 specifies the preamble by measuring a pulse width of the optical signal and detecting the special pattern unique to the preamble in the optical signal. In the period specifying phase, the controller 22 specifies the repetition period of the frame by measuring a time interval between repeatedly detected preambles.

Further, in this embodiment, after the predetermined information (position ID1 or ID2 of the illumination apparatus) is acquired in the information acquisition phase, the controller 22 notifies the output unit 25 of the acquired position ID1 or ID2 and the individual ID stored in the memory 22*b*. The output unit 25 transmits the position ID1 or ID2 and the individual ID received from the controller 22, to the external device (in this case, the server 15) through the relay unit 13 and the base unit 14.

[State Transition 4]

When completing processing on the first frame in the continuous reception mode, the optical signal receiver 12 transitions from the continuous reception mode to the intermittent reception mode. Then, when the optical signal is received by the light receiving unit 20 in the intermittent reception mode, the controller 22 operates in the optical signal irradiation phase of the intermittent reception mode ("state transition 4" of FIGS. 6A and 6B). The optical signal receiver 12 repeats the processing of the optical signal irradiation phase as long as the same frame is received. For example, while the state 2 where the optical signal including position ID1 is received by the light receiving unit 20 is continued, the optical signal receiver 12 repeats the processing of the optical signal irradiation phase.

Figure 9:
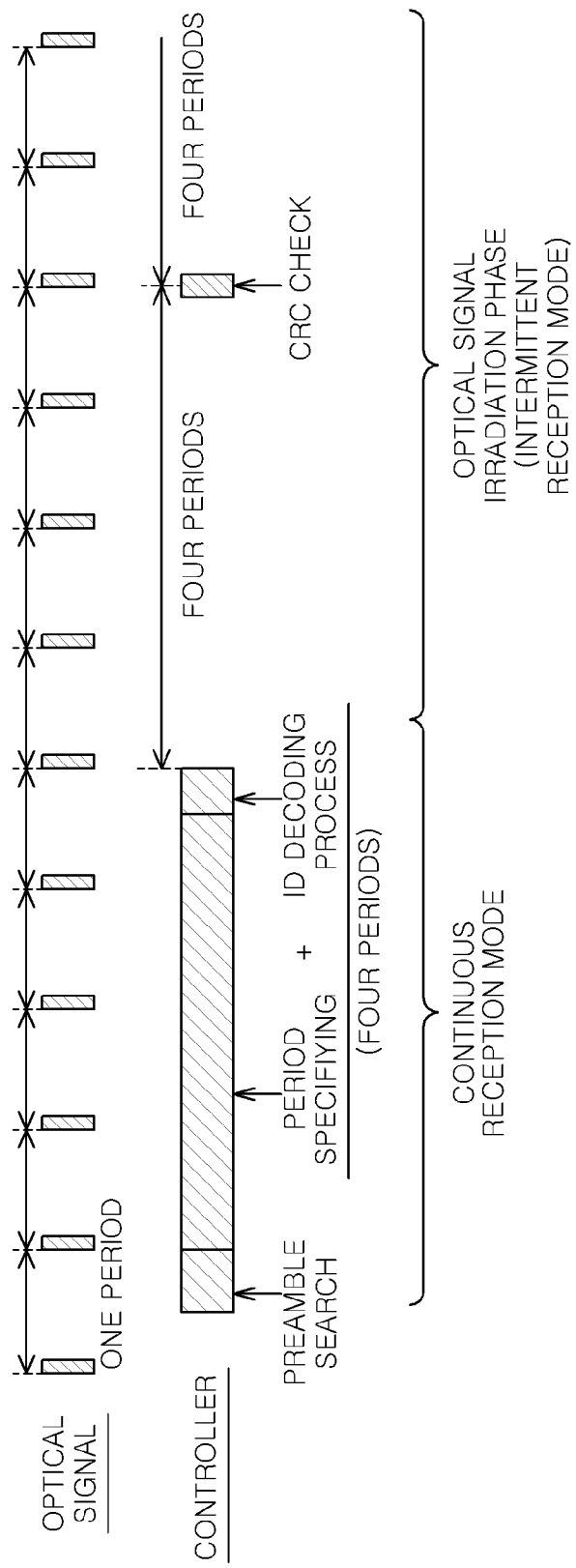
FIG. 9 is a diagram showing an operation timing of the optical signal receiver when the continuous reception mode is switched to the optical signal irradiation phase (intermittent reception mode) in the state transition diagram of FIGS. 6A and 6B.

FIG. 9 is a diagram showing an operation timing of the optical signal receiver 12 when the continuous reception mode is switched to the optical signal irradiation phase of the intermittent reception mode. In FIG. 9, a timing at which the frame of the optical signal is transmitted is illustrated in the row of "optical signal" and an operation timing of the controller 22 is illustrated in the row of "controller". In the "optical signal" of FIG. 9, one period corresponds to a period of the repeated transmission of the frame, and a hatched portion indicates the preamble of each frame. In addition, the hatched portion of "controller" indicates the time at which the controller 22 is operating, and the other portion indicates the time at which the controller 22 is sleeping.

As shown in FIG. 9, in this embodiment, the controller performs the processing of search phase, the period specifying phase, and the information acquisition phase in the continuous reception mode for the time (four periods) in which four frames including the searched preamble are transmitted. The search phase, the period specifying phase, and the information acquisition phase correspond to "preamble search," "period specifying," and "ID decoding process" respectively in FIG. 9. Then, the controller 22 transitions to the optical signal irradiation phase of the intermittent reception mode to check the CRC of the 4th frame every four periods.

Figure 10:
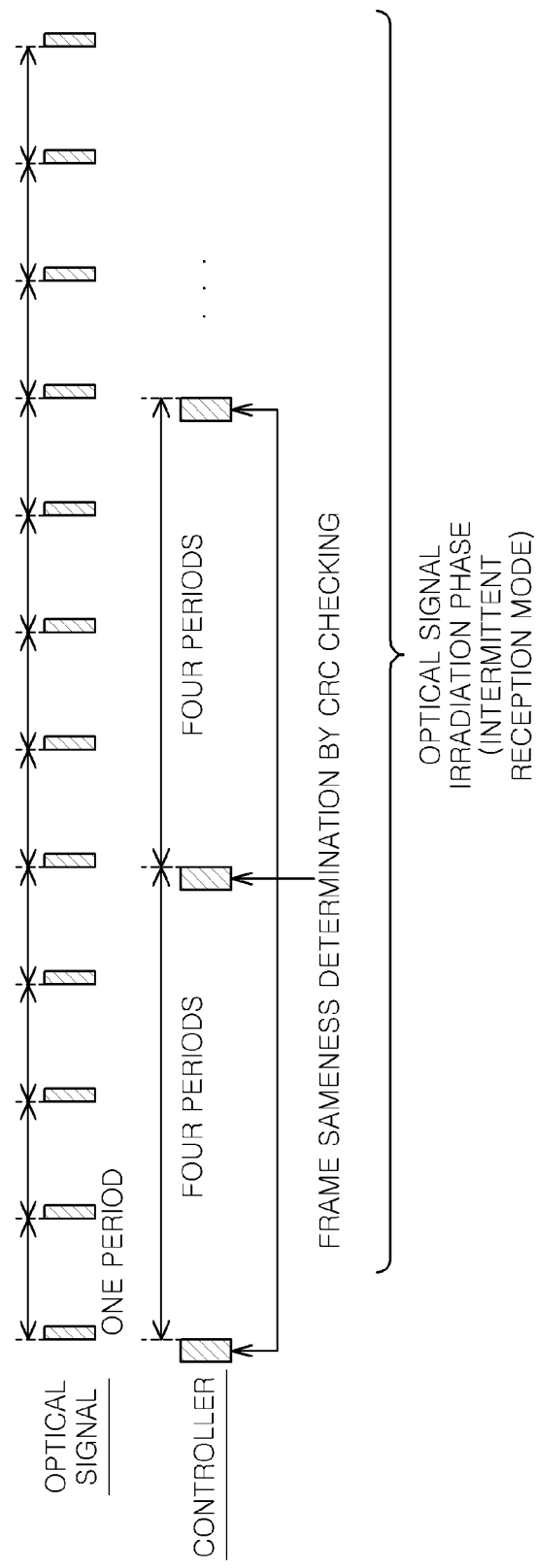
FIG. 10 is a diagram showing an operation timing of the optical signal receiver in "state transition 4" of FIG. 6B.

FIG. 10 is a diagram showing an operation timing of the optical signal receiver 12 in the optical signal irradiation phase of the intermittent reception mode, i.e., "state transition 4" of FIGS. 6A and 6B. As shown in FIG. 10, in the optical signal irradiation phase, the controller 22 determines whether or not the CRC of the 4th frame every four periods is the same as the prior one. Specifically, in the optical signal irradiation phase, the light receiving unit 20 receives specific information (in this case, CRC) included one frame of a plurality of (in this case, four) frames included in the optical signal.

Then, the controller 22 determines whether the frame currently received is a frame indicating the same information by comparing the received specific information with the specific information received immediately beforehand. In this case, based on the repetition period specified in the period specifying phase of the continuous reception mode, the light receiving unit 20 receives the specific information (in this case, CRC) whenever a plurality of (in this case, four) frames are transmitted. When it is determined that the frame currently received is a frame indicating the same information as before, the controller 22 repeats such determination (monitoring the frame).

More specifically, the controller 22 sleeps after setting the timer 22*c* to a value of about 4 times the repetition period (one period) specified in the period specifying phase. When the time has come, the controller 22 wakes from the sleep state and controls the photoelectric converter 21 to drive the light receiving unit 20. Then, the controller 22 receives the CRC through the light receiving unit 20, stores the CRC in the memory 22*b*, and compares the currently received CRC with the CRC received immediately beforehand.

As the above, in the optical signal irradiation phase, every four frames, the light receiving unit 20 is driven intermittently such that only the CRC of the 4th frame is received. Further, the controller 22 wakes from the sleep state and operates for only the time in which the sameness of the CRC is determined. Thus, in the optical signal irradiation phase, the power consumption is small compared to that in the operation mode (continuous reception mode) in which normal power supply is performed.

[State Transition 5]

In state 2 or state 3, if no optical signal is received by the light receiving unit 20, the optical signal receiver 12 transitions to the optical signal non-irradiation phase of state 1 from the optical signal irradiation phase or the continuous reception mode ("state transition 5" of FIGS. 6A and 6B). Specifically, if it is determined that no optical signal is received by the light receiving unit 20 during the continuous reception mode, after completing processing on the first frame in the continuous reception mode, or during the execution of the optical signal irradiation phase, the controller 22 performs transition from the current state to state 1.

[State Transition 6]

In the optical signal irradiation phase of state 2 or state 3, if the reception of a frame different from the prior frame is detected, the optical signal receiver 12 transitions to the continuous reception mode of state 3 or state 2 ("state transition 6" of FIGS. 6A and 6B). Specifically, in the optical signal irradiation phase, if it is determined that the frame currently received is not a frame indicating the same information as the prior one, the controller 22 transitions to the continuous reception mode from the intermittent reception mode of the optical signal irradiation phase.

For example, in the optical signal irradiation phase of state 2, if it is detected that position IDs included in the received optical signal is changed from position ID1 to position ID2, by checking the CRC, the controller 22 transitions to the continuous reception mode. After the transition to the continuous reception mode, the optical signal receiver 12 performs the operations (acquisition of information, etc.) described in the above [State 2] and [state 3]. Thus, when the optical signal receiver 12 is moved under another illumination apparatus 11, it is notified to the external device (in this embodiment, the server 15).

Figure 11:
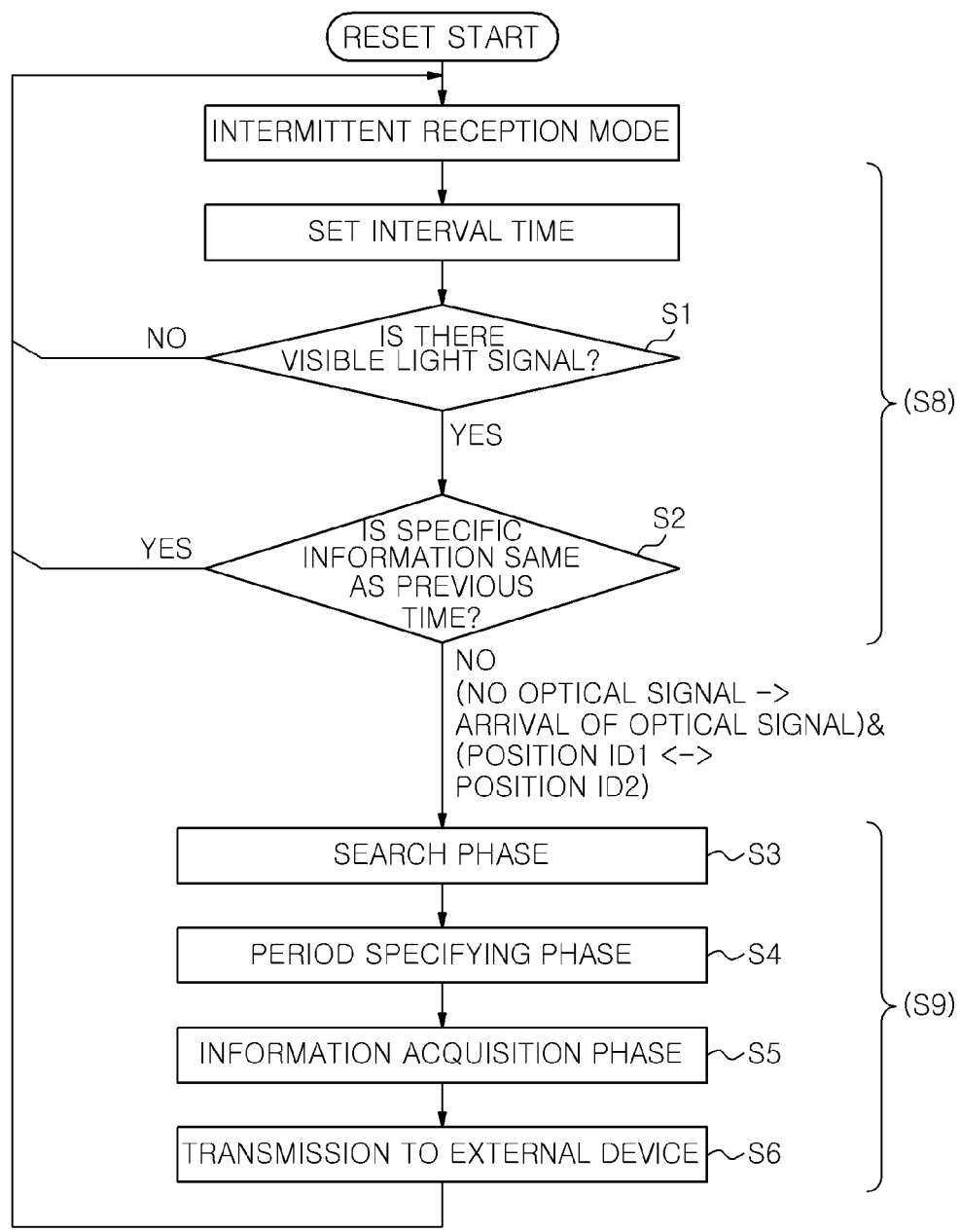
FIG. 11 is a flowchart showing an operation of the optical signal receiver.

FIG. 11 is a flowchart showing an operation of the optical signal receiver 12 in accordance with the present embodiment (i.e., an optical signal receiving method according to the present invention).

[Steps S1 and S2]

Steps S1 and S2 correspond to the intermittent reception mode.

For example, if the optical signal receiver 12 is in state 1 of FIG. 6A, the optical signal receiver 12 operates in the intermittent reception mode (optical signal non-irradiation phase) ("INTERMITTENT RECEPTION MODE"). Then, the optical signal receiver 12 sets an interval time (in this embodiment, the time for which four frames are transmitted) in the timer 22c ("INTERVAL TIMER"). The optical signal receiver 12 determines whether the optical signal is received in the interval time ("IS THERE VISIBLE LIGHT SIGNAL?") (S1), and transitions to the continuous reception mode (S3-S6) if it is determined that the optical signal is received and a specific information included in the received optical signal is different from the prior received specific information ("NO" in "IS SPECIFIC INFORMATION SAME AS PREVIOUS ONE?") (S2).

Alternatively, if the optical signal receiver 12 is in the optical signal irradiation phase of state 2 or state 3 of FIGS. 6A and 6B ("INTERMITTENT RECEPTION MODE"), similarly, the interval time (in this case, the time for which four frames are transmitted) is set in the timer 22c ("INTERVAL TIMER"). Then, the optical signal receiver 12 determines the sameness of the CRC included in the visible light signal if the visible light signal is received during the time interval ("YES" in "IS THERE VISIBLE LIGHT SIGNAL?" and then "IS SPECIFIC INFORMATION SAME AS PREVIOUS ONE?") (S1-S2), and transitions to the continuous reception mode (S3-S6) if a CRC different from the previous CRC is detected ("NO" in "IS SPECIFIC INFORMATION SAME AS PREVIOUS ONE?") (S2).

[Steps S3 to S6]

Steps S3 to S6 correspond to the continuous reception mode.

After the transition to the continuous reception mode, the optical signal receiver 12 executes the search phase (S3), the period specifying phase (S4), the information acquisition phase (S5), and transmission to the external device (S6).

[Steps S8 and S9]

Upon completion of the processing in the continuous reception mode (S9), the optical signal receiver 12 transitions to the intermittent reception mode (S8).

If the same frame is received by the optical signal receiver 12 ("YES" in "IS THERE VISIBLE LIGHT SIGNAL?" and "YES" in S2), the optical signal receiver 12 determines that the specific information (in this case, the CRC of the 4th frame) is the same. As a result, the optical signal receiver 12 repeats the optical signal irradiation phase (S1 and S2).

On the other hand, if a different frame is received by the optical signal receiver 12, the optical signal receiver 12 determines that specific information (in this case, the CRC of the 4th frame) is different from the prior one ("NO" in S2), and transitions to the continuous reception mode (S3 to S6) (S9).

As described above, the optical signal receiver 12 of the present embodiment receives an optical signal superimposed on the illumination light from the illumination apparatus 11, and includes the light receiving unit 20 for receiving an optical signal, and the controller 22 configured to perform a control according to the embodiment of the present invention. The controller 22 controls the light receiving unit 20 based on the optical signal received by the light receiving unit 20 such that the optical signal receiver 12 operates in one of the intermittent reception mode for intermittently receiving the optical signal and the continuous reception mode for continuously receiving the optical signal.

The intermittent reception mode includes the optical signal non-irradiation phase and the optical signal irradiation phase. The optical signal non-irradiation phase is a process for detecting whether the state where no optical signal is received by the optical signal receiver 12 has changed to the state where the optical signal is received by the optical signal receiver 12. The optical signal irradiation phase is a process for determining whether the frame being currently received includes the same information as that of the prior frame in the state where the optical signal is received by the optical signal receiver 12.

The continuous reception mode includes the search phase, the period specifying phase, and the information acquisition phase. The search phase is a process for searching for the preamble of the frame included in the received optical signal. The period specifying phase is a process for specifying the repetition period of the frame included in the optical signal based on the result of the search phase. The information acquisition phase is a process for acquiring predetermined information (position ID) by decoding at least one frame that has been received.

Further, the optical signal receiving method according to the present embodiment includes an intermittent reception step of operating the optical signal receiver 12 in the intermittent reception mode for intermittently receiving the optical signal, and a continuous reception step of operating the optical signal receiver 12 in the continuous reception mode for continuously receiving the optical signal. The intermittent reception mode includes the optical signal non-irradiation phase and the optical signal irradiation phase. In addition, the continuous reception mode includes the search phase, the period specifying phase, and the information acquisition phase.

Accordingly, the optical signal receiver 12 is characterized in that there is provided the intermittent reception mode which includes the optical signal irradiation phase as well as the optical signal non-irradiation phase. Specifically, the intermittent reception mode is an operation mode in which power consumption is reduced, and includes the state where the optical signal is received (optical signal irradiation phase) as well as the state where no optical signal is received (optical signal non-irradiation phase). Thus, even if the frame being currently received includes the same information as the prior frame, the optical signal is received intermittently, thereby reducing the power consumption. This suppresses the power consumption compared to a conventional case.

Further, in the optical signal irradiation phase, under the control of the controller 22, the light receiving unit 20 receives the specific information that is a part of one frame whenever a plurality of frames included in the optical signal are transmitted. Then, the controller 22 determines whether or not the frame being currently received is a frame including the same information by comparing the currently received specific information with the specific information received immediately beforehand.

Thus, since it is determined whether the same frame is received by monitoring the sameness of only part (specific information) of the frame being currently received, the power consumption is suppressed as compared with the conventional case where the determination has to be made using all of the frames.

Moreover, in the optical signal irradiation phase, under the control of the controller 22, the light receiving unit 20 receives the specific information for every a plurality of frames based on the repetition period which is specified in the period specifying phase.

Thus, since it is possible to know a transmission period of the frame being repeatedly transmitted based on the repetition period, the controller 22 can know a timing of receiving only part (specific information) of the frame being repeatedly transmitted by taking into consideration the transmission period and the position of the specific information included in the frame.

The specific information is an error detection code for detecting a data error in the frame including the specific information.

Thus, even if the frames repeatedly received is different in part between each other, the controller 22 can determine whether the frames being repeatedly transmitted are frames including the same information by monitoring the sameness of the specific information.

The optical signal is superimposed on the illumination light by the light intensity modulation using N-values pulse position modulation (NPPM) (N is an integer of 2 or more). In the optical signal non-irradiation phase, the controller detects that the state where no optical signal is received has changed to the state where the optical signal is received by determining the number of pulses included in the optical signal received in a predetermined period of time.

As described above, since the optical signal is generated by the N-values pulse position modulation, the number of pulses included in the predetermined period of time is constant regardless of the content of the information. Thus, the reception of an optical signal is detected by utilizing the characteristic.

Further, in the optical signal non-irradiation phase, the controller 22 determines the number of pulses for each period corresponding to the time for which M frames (M is an integer of 2 or more) are transmitted. On the other hand, in the optical signal irradiation phase, the controller 22 controls the light receiving unit 20 to receive the specific information of one frame of M frames every the M frames. Then, the controller 22 determines whether the frame currently received includes the same information by comparing the specific information of the currently received frame with the specific information of the frame received immediately beforehand.

Thus, in both the optical signal irradiation phase and the optical signal non-irradiation phase, the determination is made every time period corresponding to the time for which M frames is received. Accordingly, regardless of whether the optical signal is received or not, the determination is performed every same period, and blind time (determination period) in the intermittent reception mode is unified.

Furthermore, in the optical signal non-irradiation phase, if the controller 22 determines that the state where no optical signal is received has changed to the state where the optical signal is received, the optical signal receiver 12 transitions to the continuous reception mode from the intermittent reception mode.

Thus, when the reception of the optical signal is detected, the optical signal receiver 12 transitions to the continuous reception mode, and the information can be reliably acquired.

Further, in the optical signal irradiation phase, if the controller 22 determines that the frame currently received is not a frame including the same information, the optical signal receiver 12 transitions to the continuous reception mode from the intermittent reception mode.

Thus, if the information of the frame currently received is changed from that of the prior frame, new information is acquired by transitioning to the continuous reception mode. For example, if a moving body to which the optical signal receiver 12 is attached is moved and a different frame is received by the optical signal receiver 12, new information of the different frame is acquired reliably.

Additionally, when the controller 22 completes the search phase, the period specifying phase and the information acquisition phase in the continuous reception mode, the optical signal receiver 12 transitions to the intermittent reception mode from the continuous reception mode. Then, after the transition to the intermittent reception mode from the continuous reception mode, if the controller 22 determines that the optical signal is received by the light receiving unit 20, the optical signal receiver 12 operates in the optical signal irradiation phase.

Thus, since the optical signal receiver 12 transitions to the intermittent reception mode after acquiring the information of one frame, the power consumption is suppressed if a frame including the same information is repeatedly received thereafter.

Further, the optical signal receiver 12 includes the output unit 25. When the predetermined information (position ID) is acquired in the information acquisition phase, the output unit 25 transmits the acquired predetermined information (position ID) to the external device. Then, after the controller 22 transmits the information by the output unit 25, the optical signal receiver 12 transitions to the intermittent reception mode from the continuous reception mode.

Thus, since the information acquired by the optical signal receiver 12 is transmitted to the external device (server 15), the position of the optical signal receiver 12 can be specified at the external device (server 15) in case of, e.g., the position information service system.

Further, the operation of the optical signal receiver 12 of the present embodiment is not limited to the procedure shown in FIG. 11. For example, a process of suppressing the continuous reception mode from being frequently executed may be added in order to further reduce power consumption.

Figure 12:
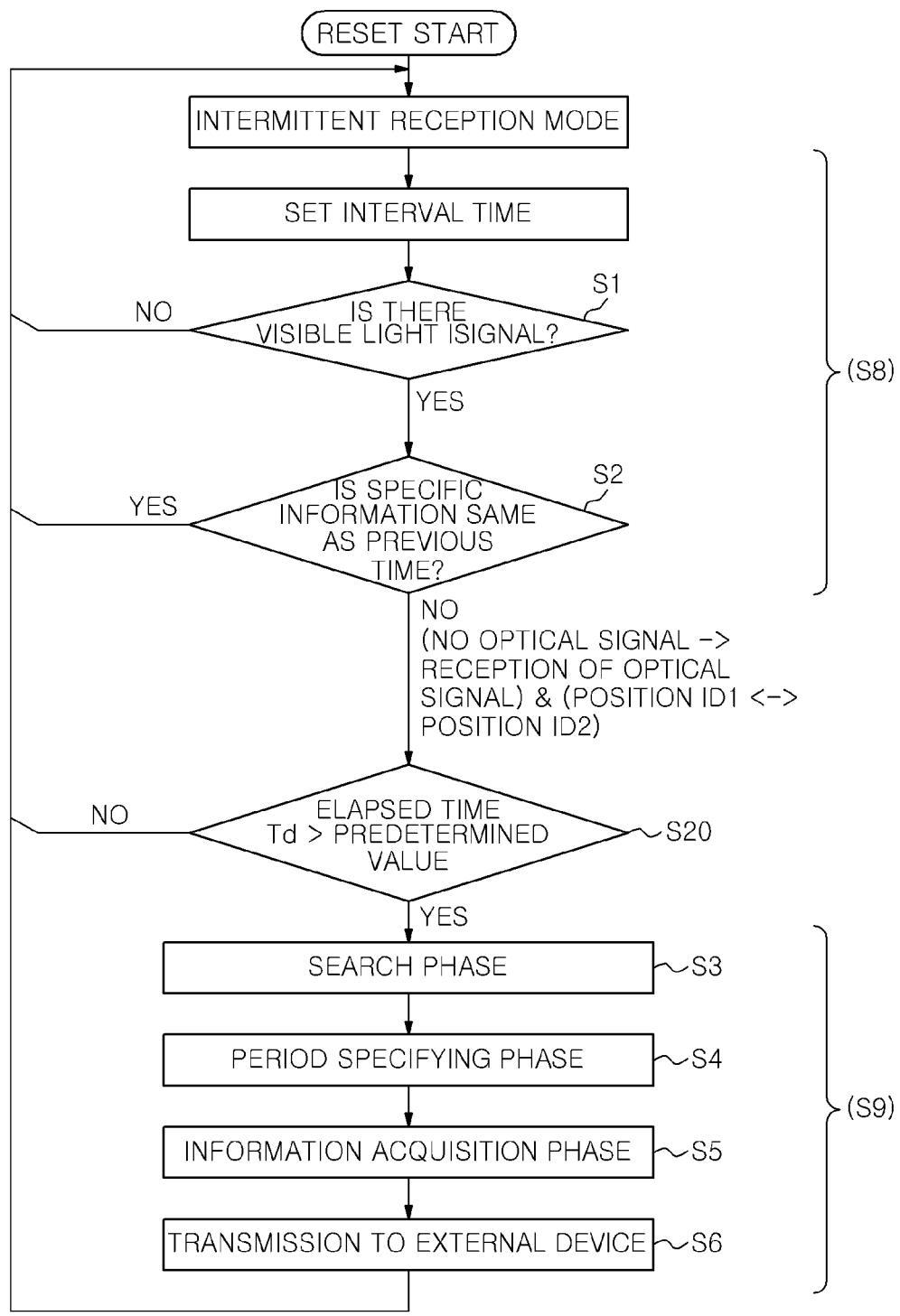
FIG. 12 is a flowchart showing an operation of the optical signal receiver having a function of suppressing the continuous reception mode from being frequently executed according to a modification of the embodiment of the present invention.

FIG. 12 is a flowchart showing the operation of the optical signal receiver 12 having a function of suppressing the continuous reception mode from being frequently executed according to a modification of the embodiment of the present invention. It is different from FIG. 11 in that step S20 is added. In this case, immediately before transition to the continuous reception mode, the optical signal receiver 12 determines whether or not an elapsed time Td from processing in the prior continuous reception mode (i.e., information acquisition phase) reaches a predetermined value (S20). When the elapsed time Td exceeds the predetermined value (Yes in S20), the optical signal receiver 12 executes the processing in the continuous reception mode (S3 to S6).

In other words, in addition to the conditions described in the above embodiment, when another certain condition is further satisfied, the optical signal receiver transitions to the continuous reception mode from the intermittent reception mode. The certain condition is determination of the controller 22 that the elapsed time Td from the time when the predetermined information (position ID) is acquired in the information acquisition phase is greater than the predetermined value.

Accordingly, even if the conditions for transition to the continuous reception mode from the intermittent reception mode as described above are satisfied, if the elapsed time Td from the previous information acquisition phase does not exceed the predetermined value, the optical signal receiver 12 is maintained in the intermittent reception mode without transitioning to the continuous reception mode. In a case where the optical signal receiver 12 is of a name tag type, the optical signal receiver 12 of the name tag type may be upside down by a posture of the nurse to which the name tag is attached while working. Accordingly, it is possible to prevent the intermittent reception mode and the continuous reception mode from being alternately repeated frequently. With the above modification, large power consumption can be avoided.

Next, there will be described an example of using the acceleration/velocity sensor 23 included in the optical signal receiver 12 of the present embodiment.

Figure 13:
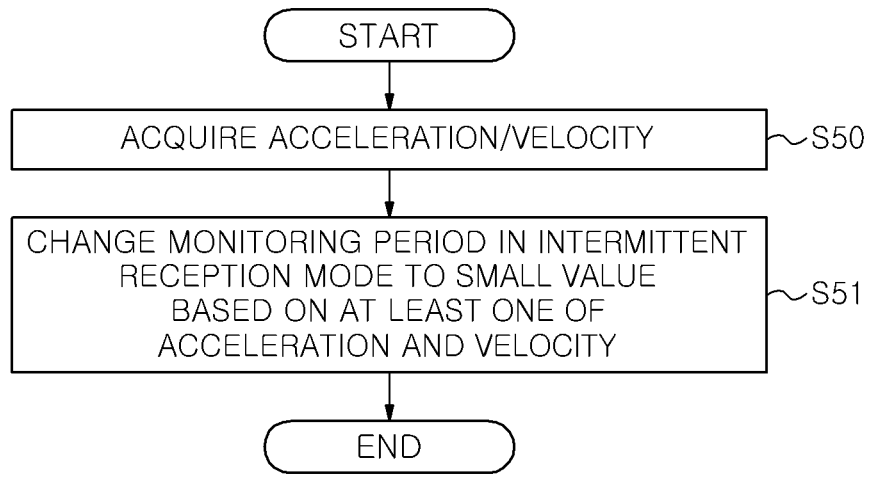
FIG. 13 is a flowchart showing an operation of the optical signal receiver according to the embodiment using an acceleration/velocity sensor.

FIG. 13 is a flowchart showing the operation of the optical signal receiver 12 using the acceleration/velocity sensor 23. First, the controller 22 acquires an output signal (signal indicating at least one of acceleration and velocity) from the acceleration/velocity sensor 23 (S50). When the optical signal receiver 12 is in, e.g., the intermittent reception mode, the controller 22 acquires at least one of the acceleration and the velocity from the acceleration/velocity sensor 23 at a predetermined time interval.

Then, the controller 22 changes the period of intermittently monitoring the optical signal in the intermittent reception mode based on at least one of the acceleration and the velocity detected by the acceleration/velocity sensor 23 (S51). Specifically, the controller 22 changes the monitoring period to a smaller value in the intermittent reception mode as at least one of the acceleration and the velocity becomes greater. If at least one of the acceleration and the velocity, which are currently acquired, is changed by a predetermined value or more from at least one of the acceleration and the velocity acquired previously, the controller 22 sets an interval time based on at least one of the acceleration and the velocity currently acquired, as the monitoring period of the intermittent reception mode, in the timer 22c. As an example, if at least one of the acceleration and the velocity is greater than the predetermined value, the interval time is set to twice the frame transmission period, and if at least one of the acceleration and the velocity is equal to or less than the predetermined value, the interval time is set to four times the frame transmission period.

Thus, in a case where the optical signal receiver 12 is attached to, e.g., a medical device that is moving at a relatively high speed, the optical signal irradiation phase or the optical signal non-irradiation phase of the intermittent reception mode is executed at a shorter time interval. Accordingly, even if the optical signal receiver is moved at high speed, it is possible to prevent the responsiveness of the position detection of the optical signal receiver 12 from being degraded. Further, in a case where the optical signal receiver 12 is placed in a location, such as a locker or a drawer of a desk, which does not move, monitoring of the intermittent reception mode is carried out at a longer time interval, and the power consumption is suppressed.

Next, there will be described an example of using the illuminance sensor 24 included in the optical signal receiver 12 of the present embodiment.

Figure 14A:
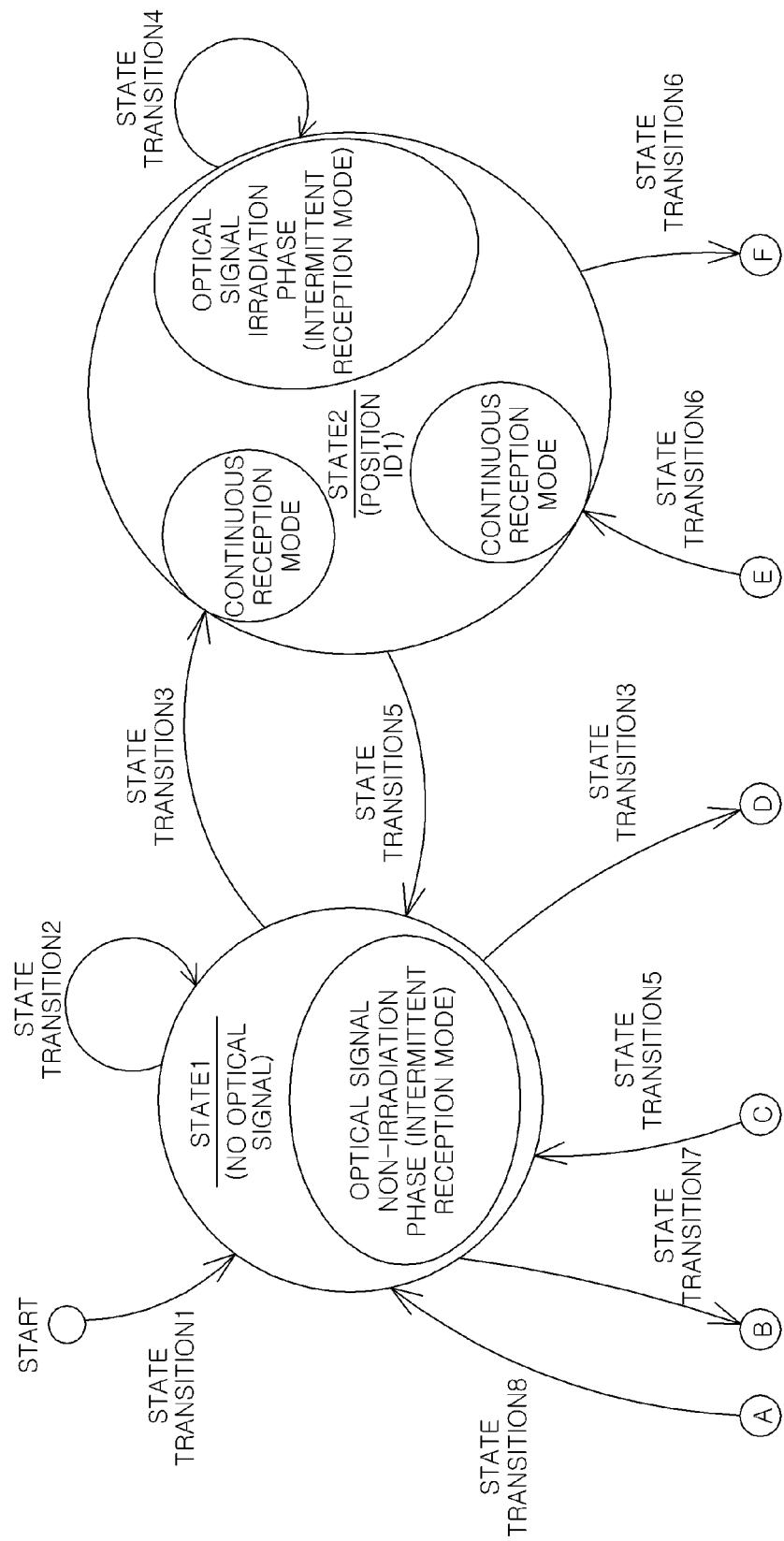
FIGS. 14A and 14B are a state transition diagram showing an operation of the optical signal receiver of the embodiment using an illuminance sensor.
Figure 14B:
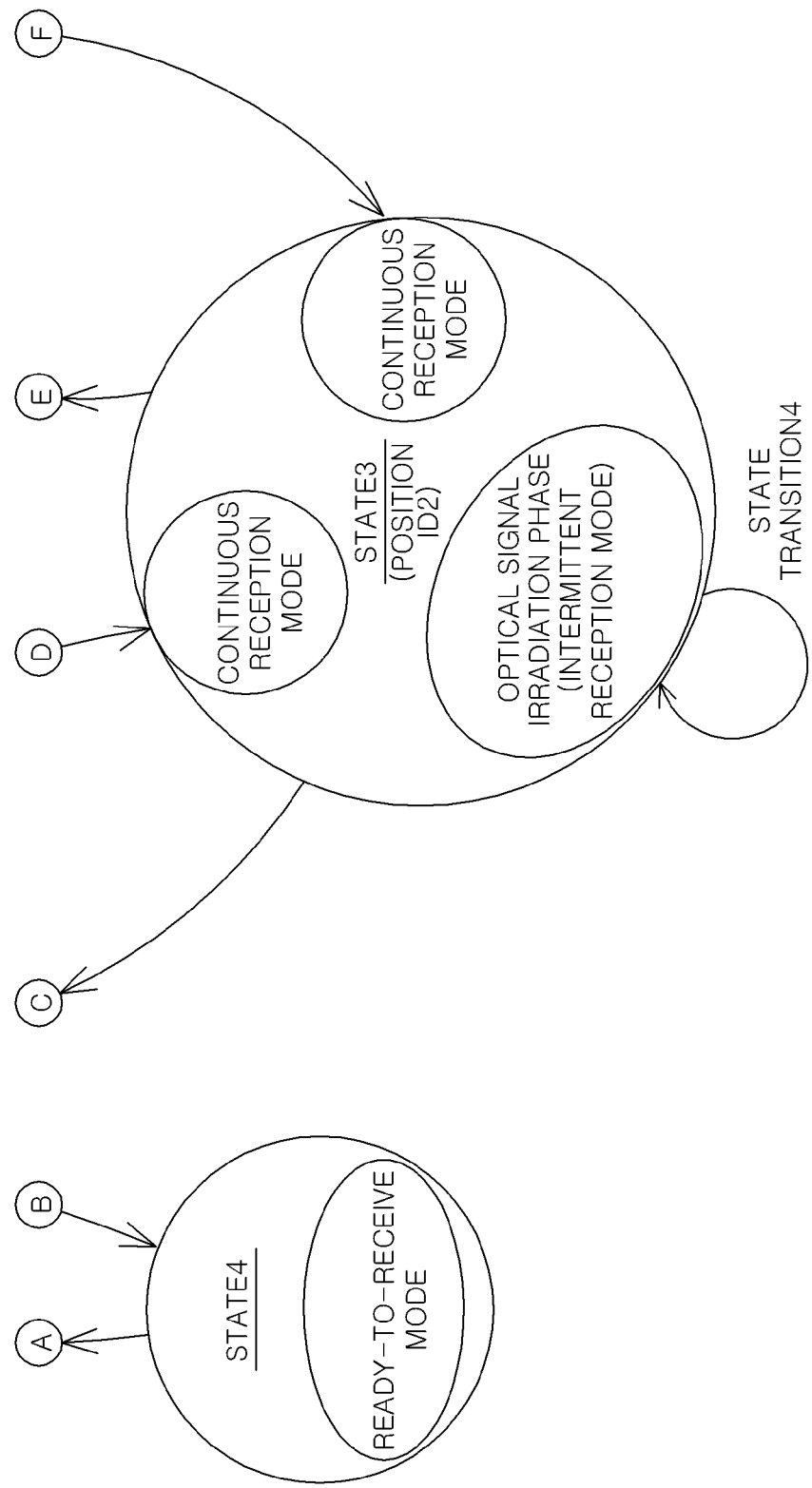

FIGS. 14A and 14B are a state transition diagram showing an operation of the optical signal receiver 12 of the present embodiment using the illuminance sensor 24. It is different from FIGS. 6A and 6B in that "state 4," "state transition 7" and "state transition 8" are added.

If the controller 22 determines that an illuminance detected by the illuminance sensor 24 is smaller than a predetermined value, the optical signal receiver 12 transitions from the intermittent reception mode to a ready-to-receive mode ("state transition 7" of FIGS. 14A and 14B). The ready-to-receive mode is an operation mode in which the optical signal receiver 12 operates at lower power consumption than the power consumption in the intermittent reception mode. For example, when the optical signal receiver 12 is in state 1, the controller 22 determines whether the illumination apparatus 11 is turned off by monitoring an output signal from the illuminance sensor 24. As a result, if it is determined that the illumination apparatus 11 is turned off, the controller 22 changes the current interval time of the intermittent reception mode to times thereof and transitions to the ready-to-receive mode.

On the other hand, if the controller 22 determines that the illuminance detected by the illuminance sensor 24 is equal to or greater than the predetermined value during the ready-to-receive mode, the optical signal receiver 12 transitions to the intermittent reception mode from the ready-to-receive mode ("state transition 8" of FIGS. 14A and 14B). Specifically, when the optical signal receiver 12 is in the ready-to-receive mode, the controller 22 determines whether the illumination apparatus 11 is turned on by monitoring the output signal from the illuminance sensor 24. Then, if it is determined that the illumination apparatus 11 is turned on, the controller 22 changes the current interval time of the intermittent reception mode to 1/10 times thereof and returns to the intermittent reception mode from the ready-to-receive mode.

As described above, when the illuminance is smaller than the predetermined value, the optical signal receiver 12 transitions to the ready-to-receive mode and operates at lower power consumption than the intermittent reception mode. Accordingly, in a case where the optical signal receiver 12 is placed below the illumination apparatus 11 which is turned off, the power consumption can be further suppressed.

In a case where the optical signal receiver 12 moves in and out of a irradiation range of illumination light from the illumination apparatus 11, if the intensity of the received optical signal is small, an unstable operation (e.g., chattering in mode transition) of the optical signal receiver 12 may occur. Therefore, a function of preventing such an unstable operation of the optical signal receiver 12 may be added to the optical signal receiver 12

Figure 15:
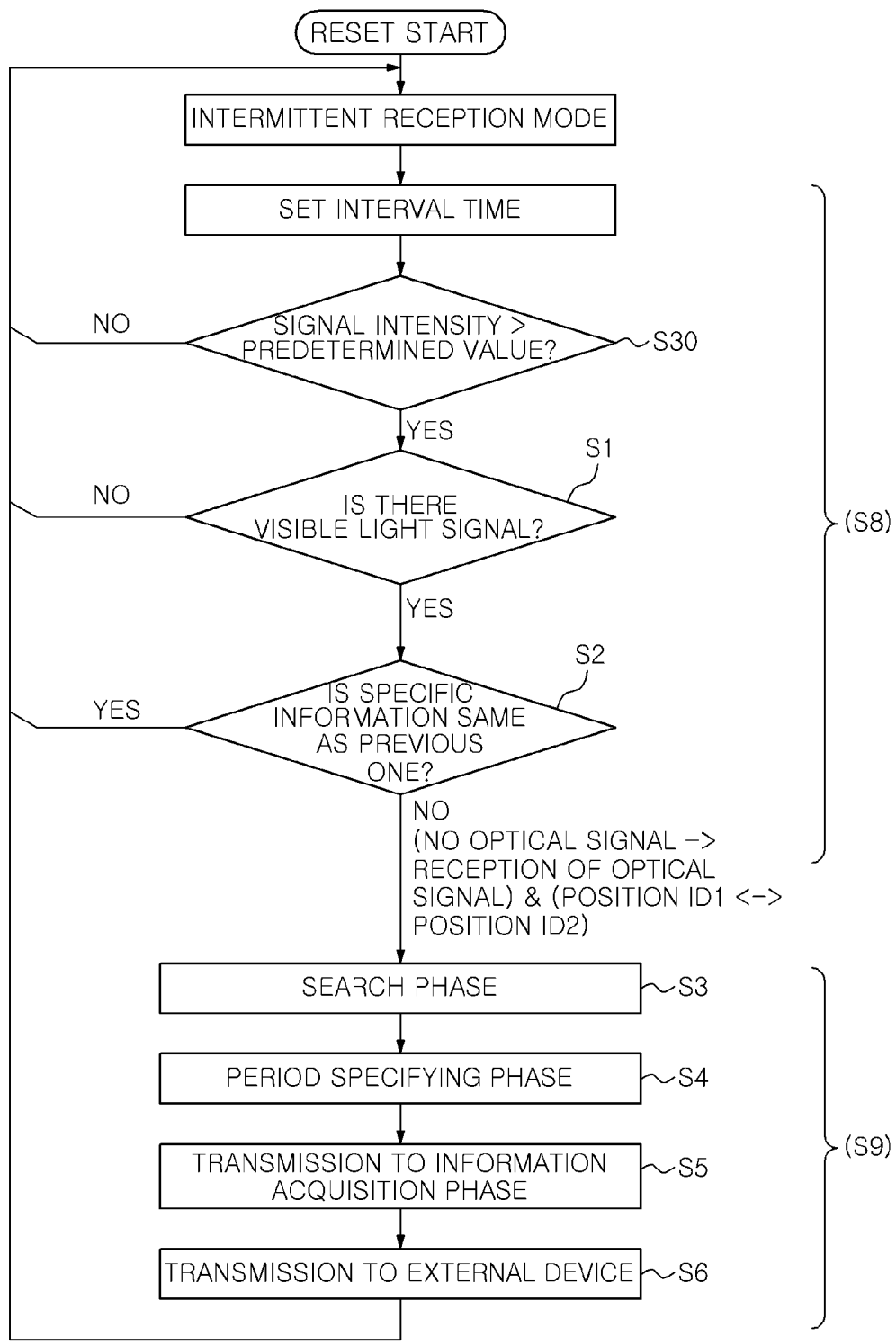
FIG. 15 is a flowchart showing an operation of the optical signal receiver having a function of preventing an unstable operation which occurs because the intensity of the optical signal is small according to another modification of the embodiment.

FIG. 15 is a flowchart showing the operation of the optical signal receiver 12 having the function of preventing an unstable operation which occurs due to the small intensity of the optical signal, according to a modification of the embodiment of the present invention. It is different from FIG. 11 in that step S30 is added.

In the intermittent reception mode, prior to the measurement of the number of pulses and the determination of the sameness of the CRC, first, the controller 22 determines whether or the intensity of the optical signal that is received by the light receiving unit 20 is greater than a predetermined threshold (S30). Specifically, the controller 22 compares the predetermined threshold with the amplitude of the signal obtained through the photoelectric converter from the light receiving unit 20 by using a built-in comparator or the like.

If the controller 22 determines that the intensity of the optical signal received by the light receiving unit 20 is equal to or less than the predetermined threshold (No in S30), the optical signal receiver 12 is maintained in the intermittent reception mode without transition to the continuous reception mode from the intermittent reception mode. That is, only if it is determined that the intensity of the optical signal received by the light receiving unit 20 is greater than the predetermined threshold (Yes in S30), the controller 22 checks the number of pulses in the predetermined period of time of the optical signal (S1), or determines the sameness of the CRC (S2).

As described above, if the intensity of the optical signal received by the light receiving unit 20 is small, the transition to the continuous reception mode from the intermittent reception mode is prohibited. Accordingly, malfunction due to an unstable state transition is avoided. For example, in the vicinity of a boundary of the irradiation range of illumination light from the illumination apparatus 11, if the optical signal receiver 12 moves in and out of the irradiation range, it is possible to avoid unstable signal acquisition caused by a weak optical signal, such as chattering in the mode transition.

In addition, if a state where communication to the server 15 from the optical signal receiver 12 is not performed for a long time is continued, it becomes unclear whether a state where the optical signal receiver 12 is at the same position is continuing or whether the optical signal receiver 12 is not working because the battery of the optical signal receiver 12 is exhausted. In this case, the server 15 may not operate properly. Therefore, if such a state continues, it is required a mechanism that allows the server 15 to know which of the two causes mentioned above has occurred.

Figure 16:
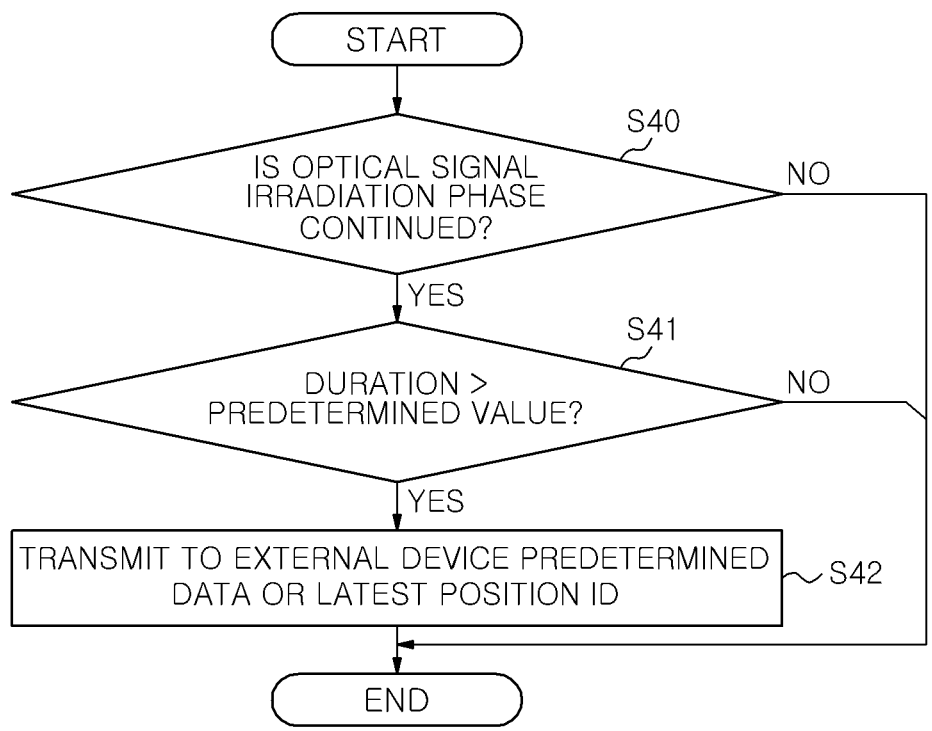
FIG. 16 is a flowchart showing an operation of the optical signal receiver having a function of allowing the server to know the state of the optical signal receiver according to still another modification.

FIG. 16 is a flowchart showing the operation of the optical signal receiver 12 having a function of allowing the server 15 to know the state of the optical signal receiver 12 according to a modification of the embodiment of the present invention.

First, if the optical signal irradiation phase is continued ('YES' in S40), the controller 22 determines whether a duration of the optical signal irradiation phase is longer than a predetermined value (e.g., 30 minutes) by using the timer 22c or the like (S41). Then, if it is determined that the duration is longer than the predetermined value (Yes in S41), the controller 22 controls the output unit 25 to perform the following operation. That is, the controller 22 transmits predetermined data or the information (position ID) acquired in the last (latest) information acquisition phase from the output unit 25 to the external device (server 15) (S42).

As described above, after completion of the information acquisition phase, if the optical signal irradiation phase is continued for a predetermined time period, the predetermined data or the predetermined information (position ID) acquired in the last (latest) information acquisition phase is transmitted from the output unit 25 to the server 15.

Thus, even while the optical signal receiver 12 repeatedly receives the same frame for a long time, the predetermined information or data is transmitted from the optical signal receiver 12 to the server 15 in a predetermined time period. Therefore, the server 15 may realize whether the optical signal receiver 12 continues to receive the same frame (whether the optical signal receiver 12 is at the same position), or whether the optical signal receiver 12 does not operate because of battery exhaustion or the like.

In the above embodiment, the optical signal receiver 12 is attached to the nurse or the medical device moving in the hospital, but it is not limited to such applications as the position information system. For example, the optical signal receiver 12 may be attached to an operator or a device in medical and nursing care facilities. Further, the optical signal communication system according to the embodiment of the present invention may be applied to a system which performs general search and management of goods or reduces the burden of daily management work of goods, by performing position management of fixed assets and equipments in an enterprise, or position management of goods, transport trolleys, shelves and the like in a factory and warehouse.

Further, in the above embodiment, the optical signal communication system 10 is configured to include the illumination apparatus 11, the optical signal receiver 12, the relay unit 13, the base unit 14, the server 15 and the terminal device 16. However, it may be configured to include at least the illumination apparatus 11 and the optical signal receiver 12. In this case, by providing a display unit or a sound generation unit in the optical signal receiver 12, the optical signal receiver 12 may be configured to present the result of receiving an optical signal to the user.

Furthermore, in the above embodiment, the type information included in the frame is not used, but the type information may be used. For example, in the continuous reception mode, the optical signal receiver 12 may be configured to acquire the type information and the information included in the payload and to transmit them to the server 15. Alternatively, only when the type information indicates predetermined information, the optical signal receiver 12 may be configured to transmit the information included in the payload to the server 15. Thus, an application system using the type information may be constructed.

In the above embodiment, the interval time of intermittent reception in the intermittent reception mode, and the processing time of the continuous reception mode are four periods (the time for which four frames are transmitted), but are not limited thereto. These times may be a natural number multiple of the frame transmission period, an arbitrary time, or a variable time that is changed in response to an event.

In the above embodiment, in the optical signal irradiation phase, the specific information detected every four periods is CRC, but it is not limited thereto. For example, it may be a part of the CRC. This is because even part of the CRC can be changed if the information included in the frame is different.

Further, in the state transition diagram of FIGS. 14A and 14B, only a transition to state 4 (ready-to-receive mode) from state 1 is illustrated, but a transition to state from another state (state 2 or state 3) may be made. Specifically, even when the optical signal receiver 12 is in state 2 or state 3, if the illuminance detected by the illuminance sensor 24 is smaller than a predetermined value, the optical signal receiver 12 may transition to state 4 (ready-to-receive mode) from the current state, i.e., state 2 or state 3. Thus, a transition to state 4 may be made in a shorter time, and wasteful power consumption can be further avoided.

Further, in the flowchart shown in FIG. 16, in a case where the duration of the optical signal irradiation phase after the end of the information acquisition phase is greater than a predetermined value, the position ID acquired in the last information acquisition phase is transmitted. However, the individual ID may also be transmitted with the position ID. Thus, the server 15 may know that the optical signal receiver 12 does not operate because of battery exhaustion or the like, through the same process as the processing for the transmission of information (position ID and individual ID) from the optical signal receiver 12 in the information acquisition phase.

Nowadays, since visible light communication is widely used in the position information service, the practical value of the present invention is extremely high.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An optical signal receiver for receiving an optical signal superimposed on illumination light from an illumination apparatus which repetitively transmits as the optical signal a frame including predetermined information and a preamble indicating the start of the frame, the optical signal receiver comprising:
   a light receiving unit configured to receive the optical signal; and
   a controller configured to control the light receiving unit based on the optical signal received by the light receiving unit such that the optical signal receiver operates in either one of an intermittent reception mode of intermittently receiving the optical signal and a continuous reception mode of continuously receiving the optical signal,
   wherein the controller is configured to operate the light receiving unit in either one of the intermittent reception mode and the continuous reception mode so as to reduce power consumption of the optical signal receiver.

2. The optical signal receiver of claim 1, wherein the intermittent reception mode includes an optical signal non-irradiation phase for detecting that the optical signal from the illumination apparatus is being transmitted, and an optical signal irradiation phase for determining whether the frame is a frame including the same predetermined information as that of a previous frame in a state where the optical signal is received by the light receiving unit, and
   wherein the continuous reception mode includes a search phase for searching for the preamble of the frame included in the received optical signal, a period specifying phase for specifying a repetition period of the frame based on results of the search phase, and an information acquisition phase for acquiring the predetermined information by decoding at least one frame included in the received optical signal.

3. The optical signal receiver of claim 2, wherein in the optical signal irradiation phase, the light receiving unit receives specific information included in one frame of M frames every M frames included in the optical signal, M being an integer of two or more, and the controller determines whether the one frame is a frame including the same specific information as the previous frame by comparing the specific information of the one frame with that of the previous frame.

4. The optical signal receiver of claim 3, wherein in the optical signal irradiation phase, the light receiving unit receives the specific information every M frames based on the repetition period specified in the period specifying phase.

5. The optical signal receiver of claim 3, wherein the specific information is an error detection code for detecting a data error of the frame to which the specific information belongs.

6. The optical signal receiver of claim 2,
   wherein the optical signal is a signal superimposed on the illumination light by using light intensity modulation and N-values pulse position modulation, N being an integer of 2 or more, and
   wherein in the optical signal non-irradiation phase, the controller detects that the optical signal from the illumination apparatus is being transmitted, by determining the number of pulses included in the optical signal received during a predetermined period of time.

7. The optical signal receiver of claim 6, wherein in the optical signal non-irradiation phase, the controller determines the number of pulses every period corresponding to a time for which a plurality of frames are transmitted.

8. The optical signal receiver of claim 7, wherein in the optical signal non-irradiation phase, the controller determines the number of pulses every period corresponding to a time for which M frames are transmitted.

9. The optical signal receiver of claim 2, wherein in the optical signal non-irradiation phase, if it is detected that the optical signal from the illumination apparatus is being transmitted, the controller allows the optical signal receiver to transition to the continuous reception mode from the intermittent reception mode.

10. The optical signal receiver of claim 9, wherein in the intermittent reception mode, when the intensity of the optical signal received by the light receiving unit is less than a predetermined value, the controller maintains the optical signal receiver in the intermittent reception mode without allowing to transition to the continuous reception mode.

11. The optical signal receiver of claim 2, wherein in the optical signal irradiation phase, if it is determined that the frame is not a frame including the same information as the previous frame, the controller allows the optical signal receiver to transition to the continuous reception mode from the intermittent reception mode.

12. The optical signal receiver of claim 11, wherein when the optical signal receiver transitions to the continuous reception mode from the intermittent reception mode, the controller allows the optical signal receiver to transition to the continuous reception mode from the intermittent reception mode only when it is determined that an elapsed time from the latest time when the predetermined information is obtained in the information acquisition phase is greater than a predetermined value.

13. The optical signal receiver of claim 2, wherein after completion of the search phase, the period specifying phase and the information acquisition phase in the continuous reception mode, the controller allows the optical signal receiver to transition to the intermittent reception mode.

14. The optical signal receiver of claim 13, wherein after the optical signal receiver is allowed to transition from the continuous reception mode to the intermittent reception mode, the controller allows the optical signal receiver to operate in the optical signal irradiation phase if the optical signal from the illumination apparatus is being transmitted.

15. The optical signal receiver of claim 2, further comprising an output unit which, after the predetermined information is acquired in the information acquisition phase, transmits the acquired predetermined information to an external device,
wherein after transmission of the predetermined information by the output unit, the controller allows the optical signal receiver to transition from the continuous reception mode to the intermittent reception mode.

16. The optical signal receiver of claim 15, wherein after completion of the information acquisition phase, if the optical signal irradiation phase is continued for a predetermined time, the output unit transmits predetermined data or the predetermined information acquired in the information acquisition phase to the external device.

17. The optical signal receiver of claim 2, further comprising an acceleration/velocity sensor configured to detect at least one of acceleration and velocity of the optical signal receiver,
wherein the controller changes a period of intermittently receiving the optical signal in the intermittent reception mode based on at least one of the acceleration and the velocity detected by the acceleration/velocity sensor.

18. The optical signal receiver of claim 2, further comprising an illuminance sensor configured to detect an illuminance,
wherein if the illuminance detected by the illuminance sensor is smaller than a predetermined value, the controller allows the optical signal receiver to transition from the intermittent reception mode to a ready-to-receive mode in which the optical signal receiver operates at lower power consumption than power consumption in the intermittent reception mode.

19. An optical signal communication system comprising:
an illumination apparatus which repetitively transmits as an optical signal a frame including predetermined information and a preamble indicating the start of the frame; and
an optical signal receiver configured to receive the optical signal superimposed on illumination light from the illumination apparatus,
wherein the optical signal receiver includes:
a light receiving unit configured to receive the optical signal; and
a controller configured to control the light receiving unit based on the optical signal received by the light receiving unit such that the optical signal receiver operates in either one of an intermittent reception mode of intermittently receiving the optical signal and a continuous reception mode of continuously receiving the optical signal,
wherein the intermittent reception mode includes an optical signal non-irradiation phase for detecting that the optical signal from the illumination apparatus is being transmitted, and an optical signal irradiation phase for determining whether the frame is a frame including the same predetermined information as that of a previous frame in a state where the optical signal is received by the light receiving unit, and
wherein the continuous reception mode includes a search phase for searching for the preamble of the frame included in the received optical signal, a period specifying phase for specifying a repetition period of the frame based on results of the search phase, and an information acquisition phase for acquiring the predetermined information by decoding at least one frame included in the received optical signal.

20. An optical signal receiving method of an optical signal receiver for receiving an optical signal superimposed on illumination light from an illumination apparatus which repeatedly transmits a frame including predetermined information and a preamble indicating the start of the frame by the optical signal, the optical signal receiving method comprising:
operating in an intermittent reception mode of intermittently receiving the optical signal, the intermittent reception mode including an optical signal non-irradiation phase for detecting that the optical signal from the illumination apparatus is being transmitted, and an optical signal irradiation phase for determining whether the frame is a frame including the same predetermined information as that of a previous frame in a state where the optical signal is received by the light receiving unit;
operating in a continuous reception mode of continuously receiving the optical signal, the continuous reception mode including a search phase for searching for the preamble of the frame included in the received optical signal, a period specifying phase for specifying a repetition period of the frame based on results of the search phase, and an information acquisition phase for acquiring the predetermined information by decoding at least one frame included in the received optical signal;
in the optical signal non-irradiation phase, transitioning to the continuous reception mode from the intermittent reception mode if it is detected that the optical signal from the illumination apparatus is being transmitted;
in the optical signal irradiation phase, transitioning to the continuous reception mode from the intermittent reception mode if it is determined that the frame is not a frame including the same information as the previous frame; and
in the continuous reception mode, transitioning to the intermittent reception mode after completion of the search phase, the period specifying phase and the information acquisition phase.

21. A non-transitory computer-readable medium having stored therein instructions that, when executed in a computer included in an optical signal receiver for receiving an optical signal superimposed on illumination light from an illumination apparatus which repeatedly transmits a frame including predetermined information and a preamble indicating the start of the frame by the optical signal, cause the computer to perform an optical signal receiving method comprising:
operating in an intermittent reception mode of intermittently receiving the optical signal, the intermittent reception mode including an optical signal non-irradiation phase for detecting that the optical signal from the illumination apparatus is being transmitted, and an optical signal irradiation phase for determining whether the frame is a frame including the same predetermined information as that of a previous frame in a state where the optical signal is received by the light receiving unit;

operating in a continuous reception mode of continuously receiving the optical signal, the continuous reception mode including a search phase for searching for the preamble of the frame included in the received optical signal, a period specifying phase for specifying a repetition period of the frame based on results of the search phase, and an information acquisition phase for acquiring the predetermined information by decoding at least one frame included in the received optical signal;

in the optical signal non-irradiation phase, transitioning to the continuous reception mode from the intermittent reception mode if it is detected that the optical signal from the illumination apparatus is being transmitted;

in the optical signal irradiation phase, transitioning to the continuous reception mode from the intermittent reception mode if it is determined that the frame is not a frame including the same information as the previous frame; and in the continuous reception mode, transitioning to the intermittent reception mode after completion of the search phase, the period specifying phase and the information acquisition phase.

\* \* \* \* \*